(12) United States Patent
Ericksen et al.

(10) Patent No.: US 12,447,789 B1
(45) Date of Patent: *Oct. 21, 2025

(54) SELECTING DIFFERENT SUSPENSION TUNES VIA A MANUALLY OPERATED SWITCH

(71) Applicant: Fox Factory, Inc., Duluth, GA (US)

(72) Inventors: Everet Owen Ericksen, Woodland, CA (US); Andrew Diao, Santa Cruz, CA (US); Mike Fraguglia, Meadow Vista, CA (US); Evan Peterson, Santa Cruz, CA (US); James T. Pickett, Santa Cruz, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,382

(22) Filed: Apr. 18, 2024

Related U.S. Application Data

(63) Continuation of application No. 17/103,483, filed on Nov. 24, 2020, now Pat. No. 11,975,792.

(60) Provisional application No. 62/940,751, filed on Nov. 26, 2019.

(51) Int. Cl.
*B60G 17/015* (2006.01)
(52) U.S. Cl.
CPC ................. *B60G 17/015* (2013.01)
(58) Field of Classification Search
CPC .............. B62K 25/06; B62K 2025/044; B62K 2025/048; B60G 2600/20; B60G 17/06
See application file for complete search history.

(56) References Cited

U.S. PATENT DOCUMENTS

| | | |
|---|---|---|
| 3,986,118 A | 10/1976 | Madigan |
| 4,773,671 A | 9/1988 | Inagaki |
| 4,984,819 A | 1/1991 | Kakizaki et al. |
| 5,027,303 A | 6/1991 | Witte |
| 5,105,918 A | 4/1992 | Hagiwara et al. |
| 5,390,949 A | 2/1995 | Naganathan et al. |
| 5,952,823 A | 9/1999 | Sprecher et al. |

(Continued)

FOREIGN PATENT DOCUMENTS

| | | |
|---|---|---|
| DE | 102008052134 A1 | 4/2009 |
| DE | 102010055830 A1 | 6/2012 |

(Continued)

OTHER PUBLICATIONS

European Search Report for European Application No. 20210102.8, 8 Pages, Mailed Mar. 23, 2021.

(Continued)

*Primary Examiner* — Paul N Dickson
*Assistant Examiner* — Tiffany L Webb

(57) ABSTRACT

A system and method to select and implement a suspension tune is disclosed. The system includes a memory configured to store a plurality of suspension tunes. A suspension controller configured to implement one of the plurality of suspension tunes for at least one suspension component of a vehicle. A manually operated switch to receive a user input, the manually operated switch configured to navigate between the plurality of suspension tunes, and, based on the user input, designate a different one of the plurality of suspension tunes to be implemented by the suspension controller.

2 Claims, 20 Drawing Sheets

(56) References Cited

U.S. PATENT DOCUMENTS

| | | |
|---|---|---|
| 6,244,398 B1 | 6/2001 | Girvin et al. |
| 6,427,812 B2 | 8/2002 | Crawley et al. |
| 6,734,376 B2 | 5/2004 | Ichida et al. |
| 6,863,291 B2 | 3/2005 | Miyoshi |
| 6,935,157 B2 | 8/2005 | Miller |
| 7,374,028 B2 | 5/2008 | Fox |
| 8,627,932 B2 | 1/2014 | Marking |
| 8,655,548 B2 | 2/2014 | Ichida et al. |
| 8,781,680 B2 | 7/2014 | Ichida et al. |
| 8,857,580 B2 | 10/2014 | Marking |
| 9,027,937 B2 | 5/2015 | Ryan et al. |
| 9,033,122 B2 | 5/2015 | Ericksen et al. |
| 9,120,362 B2 | 9/2015 | Marking |
| 9,239,090 B2 | 1/2016 | Marking et al. |
| 9,284,016 B2 | 3/2016 | Takamoto et al. |
| 9,353,818 B2 | 5/2016 | Marking |
| 9,650,094 B2 | 5/2017 | Laird et al. |
| 10,336,148 B2 | 7/2019 | Ericksen et al. |
| 10,556,638 B2 | 2/2020 | Sato et al. |
| 10,689,059 B2 | 6/2020 | Sullivan et al. |
| 11,459,050 B2 | 10/2022 | Allinger et al. |
| 11,713,093 B2 | 8/2023 | Ericksen et al. |
| 11,975,792 B2 * | 5/2024 | Ericksen ............ B60G 17/06 |
| 2010/0010709 A1 | 1/2010 | Song |
| 2010/0198453 A1 | 8/2010 | Dorogusker et al. |
| 2010/0327542 A1 | 12/2010 | Hara et al. |
| 2012/0166044 A1 | 6/2012 | Battlogg et al. |
| 2012/0221203 A1 | 8/2012 | Ichida et al. |
| 2012/0253601 A1 | 10/2012 | Ichida et al. |
| 2013/0090195 A1 | 4/2013 | Yamaguchi et al. |
| 2013/0144489 A1 | 6/2013 | Galasso et al. |
| 2014/0345411 A1 | 11/2014 | Miki et al. |
| 2015/0057885 A1 | 2/2015 | Brady et al. |
| 2016/0355226 A1 | 12/2016 | Pelot et al. |
| 2019/0184782 A1 | 6/2019 | Shaw et al. |

FOREIGN PATENT DOCUMENTS

| | | |
|---|---|---|
| DE | 102013210553 A1 | 12/2014 |
| DE | 102015107738 A1 | 11/2016 |
| DE | 102015208336 A1 | 11/2016 |
| WO | 2018189712 A1 | 10/2018 |
| WO | 2019125956 A1 | 6/2019 |

OTHER PUBLICATIONS

Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.

European Examination Report for European Application No. 20210102. 8, 6 Pages, Mailed Sep. 5, 2024.

European Examination Report for European Application No. 20210102. 8, 5 Pages, Mailed Apr. 2, 2024.

* cited by examiner

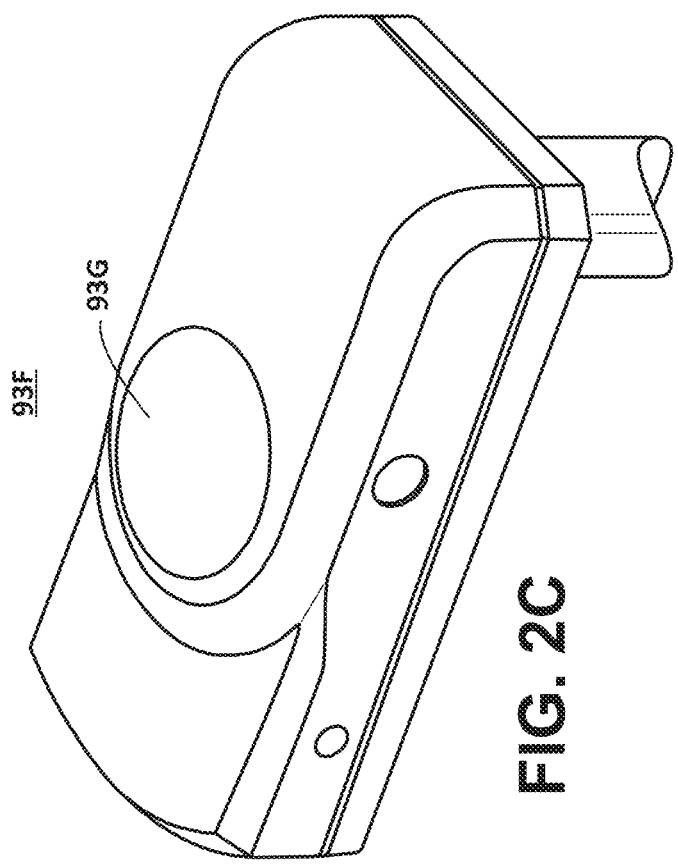
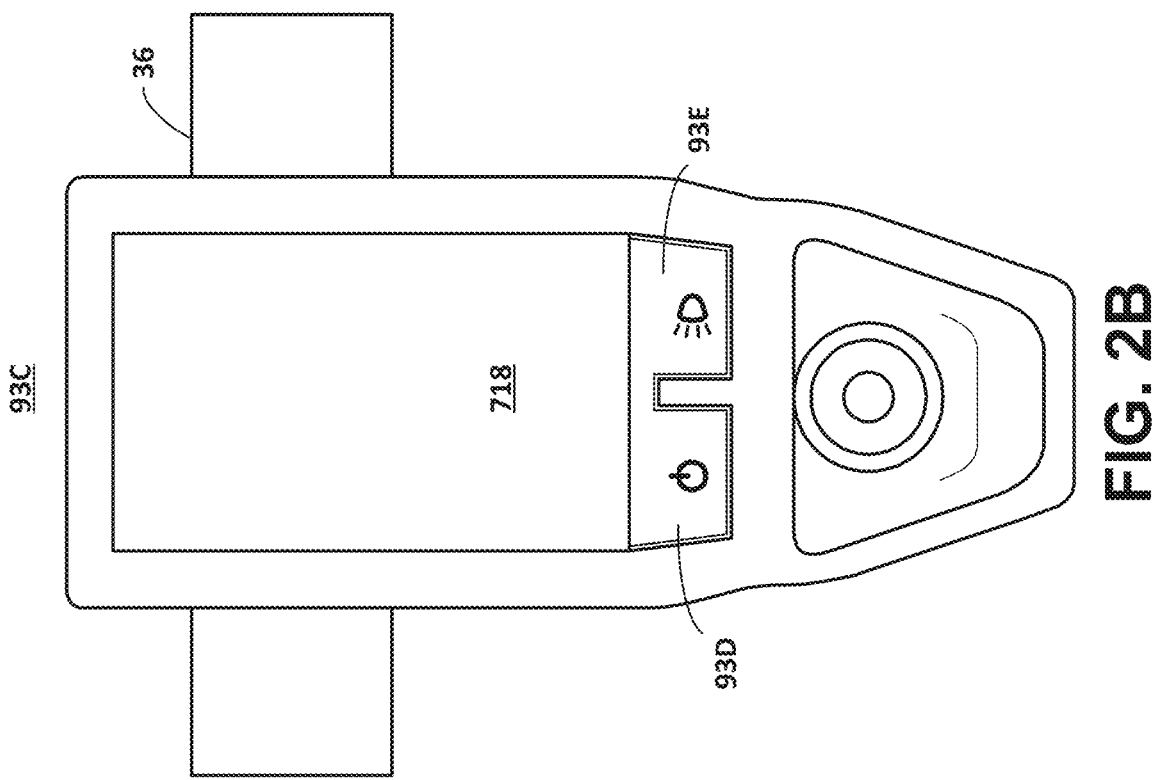
FIG. 2C
FIG. 2B

FIG. 14

SELECTING DIFFERENT SUSPENSION TUNES VIA A MANUALLY OPERATED SWITCH

CROSS REFERENCE TO RELATED APPLICATIONS

This application is a Continuation of and claims priority to and benefit of co-pending U.S. patent application Ser. No. 17/103,483 filed on Nov. 24, 2020, entitled "SELECTING DIFFERENT SUSPENSION TUNES VIA A MANUALLY OPERATED SWITCH" by Everet Ericksen et al., and assigned to the assignee of the present application, the disclosure of which is hereby incorporated by reference in its entirety.

The application Ser. No. 17/103,483 claims priority to and benefit of U.S. Provisional Patent Application No. 62/940, 751 filed on Nov. 26, 2019, entitled "Selecting Different Active Valve Control Tunes Via A Switch Communicatively Coupled With A Mobile Device" by Everet Ericksen et al., and assigned to the assignee of the present application, the disclosure of which is hereby incorporated by reference in its entirety.

FIELD OF THE INVENTION

Embodiments of the invention generally relate to methods and apparatus for use in vehicle suspension. Particular embodiments of the invention relate to methods and apparatus for developing tunes applicable to one or more active valves in vehicle damping assemblies.

BACKGROUND OF THE INVENTION

Vehicle suspension systems typically include a spring component or components and a damping component or components that form a suspension to provide for a comfortable ride, enhance performance of a vehicle, and the like. For example, a firmer suspension is usually preferred on smooth terrain while a softer suspension is often the choice for an off-road environment. The introduction of active suspension capabilities can provide on-the-fly suspension adjustments that allow a rider to modify some suspension characteristics as the rider encounters different terrain. However, as the suspension system is a collection of compromises, a change to a certain suspension characteristic (e.g., damper firmness, softness, etc.) can have deleterious effects to other aspects of damper operation, vehicle performance, and the like.

BRIEF DESCRIPTION OF THE DRAWINGS

FIG. 2B is a top view of a switch for selecting different active valve control tunes with a display, in accordance with an embodiment.

FIG. 2C is a perspective view of a button type switch for selecting different active valve control tunes, in accordance with an embodiment.

FIG. 14 is a screenshot of a ride settings management page, in accordance with an embodiment.

Figure 1A:
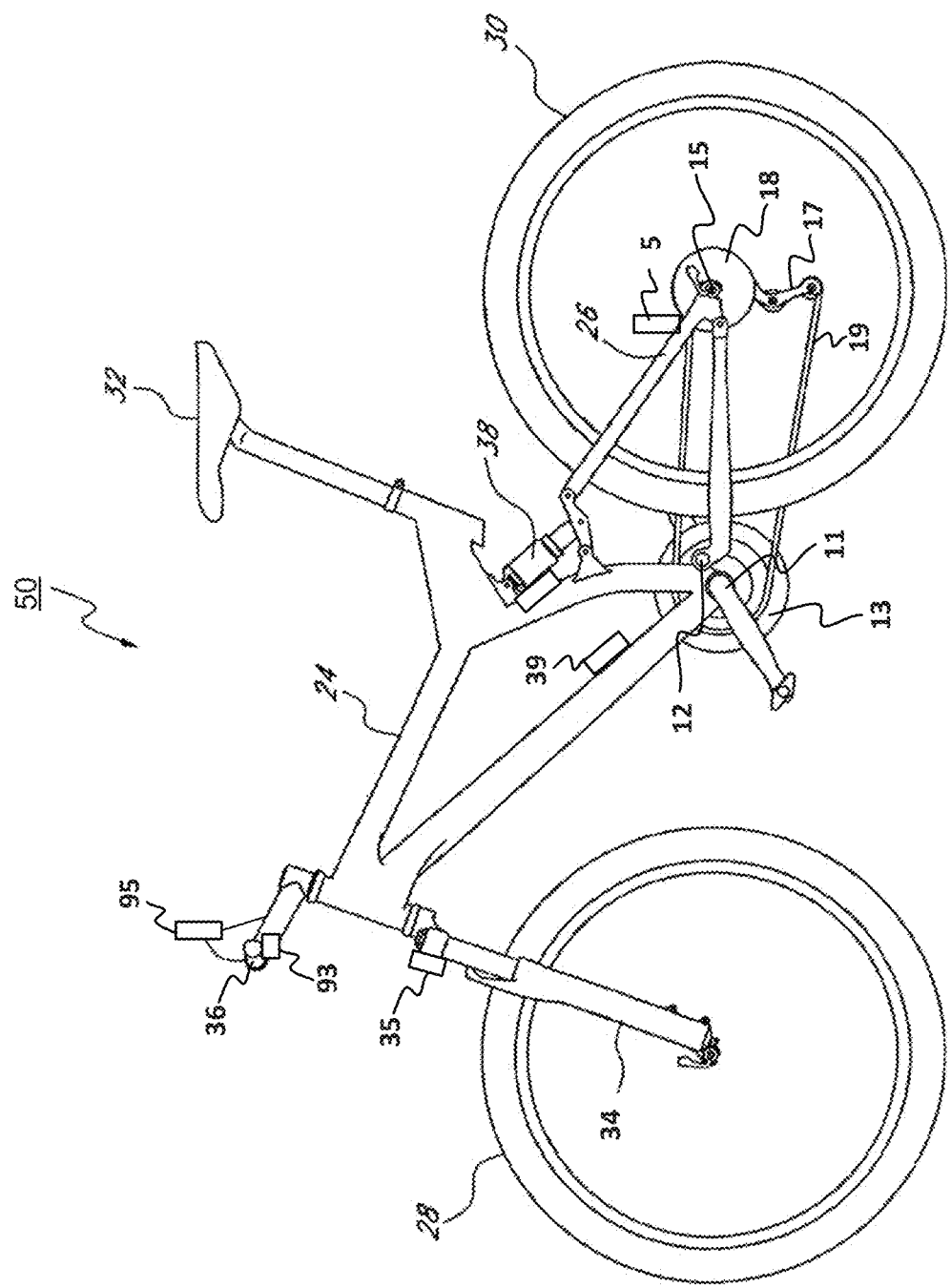
FIG. 1A is a perspective view of a bicycle, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Further, in the following discussion, the term "active", as used when referring to a valve or damping component, means adjustable, manipulatable, etc., during typical operation of the valve. For example, an active valve can have its operation changed to thereby alter a corresponding damping characteristic from a "soft" damping setting to a "firm" damping setting by, for example, adjusting a switch in a passenger compartment of a vehicle. Additionally, it will be understood that in some embodiments, an active valve may also be configured to automatically adjust its operation, and corresponding damping characteristics, based upon, for example, operational information pertaining to the vehicle and/or the suspension with which the valve is used. Similarly, it will be understood that in some embodiments, an active valve may be configured to automatically adjust its operation, and corresponding damping characteristics, to provide damping based upon received user input settings (e.g., a user-selected "comfort" setting, a user-selected "sport" setting, and the like). Additionally, in many instances, an "active" valve is adjusted or manipulated electronically (e.g., using a powered solenoid, or the like) to alter the operation or characteristics of a valve and/or other component. As a result, in the field of suspension components and valves, the terms "active", "electronic", "electronically controlled", and the like, are often used interchangeably.

In the following discussion, the term "manual" as used when referring to a valve or damping component means manually adjustable, physically manipulatable, etc., without requiring disassembly of the valve, damping component, or suspension damper which includes the valve or damping component. In some instances, the manual adjustment or physical manipulation of the valve, damping component, or suspension damper, which includes the valve or damping component, occurs when the valve is in use. For example, a manual valve may be adjusted to change its operation to alter a corresponding damping characteristic from a "soft" damping setting to a "firm" damping setting by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension").

In a conventional "fully active suspension", a motive source such as, for example, an actuator, is used to move (e.g. raise or lower) a wheel with respect to the vehicle. In a "semi-active suspension", no motive force/actuator is employed to move (e.g. raise or lower) a wheel with respect to the vehicle. Rather, in a "semi-active suspension", the characteristics of the suspension (e.g. the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to move (e.g. raise or lower) a wheel with respect to the vehicle. As such, it will be understood that an "active valve", as defined above, is well suited for use in a "fully active suspension" or a "semi-active suspension".

In the following discussion, and for purposes of clarity, a bicycle is utilized as the example vehicle. However, in another embodiment, the vehicle could be on any one of a variety of vehicles that utilize active valve dampers such as, but not limited to, a bicycle, a motorized bicycle, a motorcycle, a watercraft (e.g., boat, jet ski, PWC, etc.), a snow machine, a single wheeled vehicle, a multi-wheeled vehicle, a side-by-side, an on- and/or off-road vehicle, or the like. In general, a motorized bike can include a bike with a combustion motor, an electric bike (e-bike), a hybrid electric and combustion bike, a hybrid motor and pedal powered bike, and the like.

Overview

As discussed herein, an active valve system uses one or more sensor to essentially read the terrain. The goal is to discern if the bike is experiencing bumpy or smooth terrain and then change the suspension characteristics accordingly. On smooth terrain, the suspension is in the firm mode. In bumpy terrain, the suspension is in the soft mode. In one embodiment, the active adjustment of suspension characteristics is accomplished using aspects such as when the sensor's signal exceeds a configurable threshold, the active valve system opens solenoids in the rear shock and/or front fork, putting one or both in soft mode. After a configurable period of time (e.g., 500 ms) where no further bumps are detected, the shock and/or fork return to firm mode.

In one embodiment, there are several other active adjustments that can be made by the active valve system. For example, the above threshold and timer values can be changed based on the incline/decline angle of the bike. For example, there can be one set of configurable thresholds and timers for decline mode, another for flat riding, and yet another set for climbing. Moreover, the angles that constitute decline, flat or incline attitudes are also configurable. Finally, the active valve system has control style adjustment characteristics that dictate whether two or more of the suspension dampers work together (both going to soft mode together, for example), or independently.

The active valve system also allows for groups of the above settings to be packaged as a set, called an "active valve suspension tune" or "tune". Using the active valve system smartphone app, these groupings allow users to swap tunes conveniently and quickly as they encounter new terrain or ride conditions. As changes are made, they are immediately transmitted via Bluetooth (or other near field communication (NFC) protocols) to the bike's active valve controller.

In one embodiment, the active valve controller has the capability to store a given number of tunes, such that each stored tune would be instantly available during the ride.

Operation

FIG. 1A is a perspective view of a bicycle 50 in accordance with an embodiment. Although a bicycle 50 is used in the discussion, the system could be used for a number of different vehicles with a semi-active damping system such as, but not limited to an e-bike, a motorcycle, ATV, jet ski, car, snow mobile, side-by-side, and the like. In one embodiment, the system could be used in one or more different locations on any of the different vehicles. For example, in one embodiment, the semi-active damping system could be used in one or more dampers in suspension systems for a wheel, a frame, a seat, a steering assembly, or any other component that utilizes a damper.

Bicycle 50 has a main frame 24 with a suspension system comprising a swing arm 26 that, in use, is able to move relative to the rest of main frame 24; this movement is permitted by, inter alia, a rear active valve damper 38. The front forks 34 also provide a suspension function via a damping assembly (similar to active valve damper 38 described herein) in at least one fork leg; as such the bicycle 50 is a full suspension bicycle (such as an ATB or mountain bike). However, the embodiments described herein are not limited to use on full suspension bicycles. In particular, the term "suspension system" is intended to include vehicles having front suspension only, rear suspension only, seat suspension only, a combination of two or more different suspensions, and the like.

In one embodiment, swing arm 26 is pivotally attached to the main frame 24 at pivot point 12 which is located above the bottom bracket axis 11. Although pivot point 12 is shown in a specific location, it should be appreciated that pivot point 12 can be found at different distances from bottom bracket axis 11 depending upon the rear suspension configuration. The use of the specific pivot point 12 herein is provided merely for purposes of clarity. Bottom bracket axis 11 is the center of the pedal and front sprocket assembly 13. Bicycle 50 includes a front wheel 28 which is coupled to the main frame 24 via front fork 34 and a rear wheel 30 which is coupled to the main frame 24 via swing arm 26. A seat 32 is connected to the main frame 24 in order to support a rider of the bicycle 50.

The front wheel 28 is supported by a front fork 34 which, in turn, is secured to the main frame 24 by a handlebar assembly 36. The rear wheel 30 is connected to the swing arm 26 at rear axle 15. A rear damping assembly (e.g., active valve damper 38) is positioned between the swing arm 26 and the main frame 24 to provide resistance to the pivoting motion of the swing arm 26 about pivot point 12. Thus, the illustrated bicycle 50 includes a suspension member between swing arm 26 and the main frame 24 which operate to substantially reduce rear wheel 30 impact forces from being transmitted to the rider of the bicycle 50.

Bicycle 50 is driven by a chain 19 that is coupled with both front sprocket assembly 13 and rear sprocket 18. As the rider pedals the front sprocket assembly 13 is rotated about bottom bracket axis 11 a force is applied to chain 19 which transfers the energy to rear sprocket 18. Chain tension device 17 provides a variable amount of tension on chain 19.

In one embodiment, bicycle 50 includes one or more sensors, smart components, or the like for sensing changes of terrain, bicycle 50 pitch, roll, yaw, speed, acceleration, deceleration, or the like.

In one embodiment, a sensor 5 is positioned proximate the rear axle 15 of bicycle 50. In another embodiment a sensor 35 is positioned proximate to front fork 34. In yet another embodiment, both sensor 5 and sensor 35 are on bicycle 50.

In one embodiment, the angular orientation of the sensor is movable through a given range, thereby allowing alteration of a force component sensed by the sensor in relation to a force (vector) input. In one embodiment, the value for the range is approximately 120°. In one embodiment, the value for the range is approximately 100°. It is understood that the sensor can be moved or mounted in any suitable configuration and allowing for any suitable range of adjustment as may be desirable. That is useful for adjusting the sensitivity of the sensor to various anticipated terrain and bicycle speed conditions (e.g., the bicycle speed affects the vector magnitude of a force input to the bicycle wheel for constant amplitude terrain disparity or "bump/dip." Varying size bumps and dips also affect the vector input angle to the wheel for constant bicycle speed).

The sensors may be any suitable force or acceleration transducer (e.g. strain gage, wheatstone bridge, accelerometer, hydraulic, interferometer based, optical, thermal or any suitable combination thereof). One or more sensors may utilize solid state electronics, electro-mechanical principles or MEMS, or any other suitable mechanisms. In one embodiment, the sensor comprises a single axis self-powered accelerometer, such as for example ENDEVCO® model 2229C. The 2229C is a comparatively small device with overall dimensions of approximately 15 mm height by 10 mm diameter, and weighs 4.9 g. Its power is self-generated and therefore the total power requirements for the bicycle 50 are reduced; this is an advantage, at least for some types of bicycles, where overall weight is a concern. An alternative single axis accelerometer is the ENDEVCOR 12MIA, which is of the surface-mount type. The 12M1A is a single axis accelerometer comprising a bimorph sending element which operates in the bender mode. This accelerometer is particularly small and light, measuring about 4.5 mm by 3.8 mm by 0.85 mm, and weighs 0.12 g. In one embodiment, the sensor may be a triaxial accelerometer such as the ENDEVCO® 67-100. This device has overall dimensions of about 23 mm length and 15 mm width, and weighs 14 g.

One or more sensor(s) may be attached to the swing arm 26 directly, to any link thereof, to an intermediate mounting member, to front fork 34, or to any other portion or portions of the bicycle 50 as may be useful. In one embodiment, a sensor is fixed to an unsprung portion of the bicycle 50, such as for example the swing arm assembly 10. In one embodiment, the sensor is fixed to a sprung portion of the bicycle 50, such as the main frame 24. In general, one or more sensors may be integrated with the vehicle structure and data processing system as described in U.S. Pat. Nos. 6,863,291; 4,773,671; 4,984,819; 5,390,949; 5,105,918; 6,427,812; 6,244,398; 5,027,303 and 6,935,157; each of which is herein incorporated, in its entirety, by reference. Sensors and valve actuators (e.g. electric solenoid or linear motor type—note that a rotary motor may also be used with a rotary actuated valve) may be integrated herein utilizing principles outlined in SP-861-Vehicle Dynamics and Electronic Controlled Suspensions SAE Technical Paper Series no. 910661 by Shiozaki et. al. for the International Congress and Exposition, Detroit, Mich., Feb. 25-Mar. 1, 1991 which paper is incorporated herein, in its entirety, by reference. Further, sensors and valves, or principles, of patents and other documents incorporated herein by reference, may be integrated one or more embodiments hereof, individually or in combination, as disclosed herein.

In one embodiment, sensor information is obtained from mobile device 95. Although mobile device 95 is shown mounted to handlebar assembly 36, it should be appreciated that the mobile device 95 could be in a rider's backpack, pocket, or the like and still provide the sense input information.

In general, mobile device 95 is a smart device such as a mobile phone, a smart phone, a tablet, a smart watch, a piece of smart jewelry, smart glasses, or other user portable device(s) having wireless connectivity. Mobile device 95 is capable of broadcasting and receiving via at least one network, such as, but not limited to, WiFi, Cellular, Bluetooth, NFC, and the like. In one embodiment, mobile device 95 includes one or more of a display, a processor, a memory, a GPS, a camera, and the like.

In one embodiment, location information can be provided by the GPS. Further, the location information could be enhanced by the broadcast range of an identified beacon, a WiFi hotspot, overlapped area covered by a plurality of mobile telephone signal providers, or the like. In one embodiment, instead of using GPS information, the location of mobile device 95 is determined within a given radius, such as the broadcast range of an identified beacon, a WiFi hotspot, overlapped area covered by a plurality of mobile telephone signal providers, or the like. In one embodiment, geofences are used to define a given area and an alert or other indication is made when the mobile device 95 enters into or departs from a geofence.

Mobile device 95 includes sensors such as audio, visual, motion, acceleration, altitude, GPS, and the like. In one embodiment, mobile device 95 includes an optional application that operates thereon.

In one embodiment, switch 93 is a manually operated switch used in conjunction with the active valve suspension and the active valve mobile device application (e.g., mobile device application 1124 discussed in further detail herein). In one embodiment, switch 93 is a multi-positional switch, an upshift/downshift type of switch, a button type switch, or the like. For example, switch 93 would be a 2-position switch, a 3-position switch, a switch that can cycle through a number of different active valve suspension tunes (similar to a gear shift), or the like.

Some or all of components of embodiments herein including sensors, switches, controllers, valves, and the like may be interconnected or connected by wire, wireless, NFC, WAN, LAN, Bluetooth, WiFi, ANT, GARMIN® low power usage protocol, or any suitable power or signal transmitting mechanism.

Figure 1B:
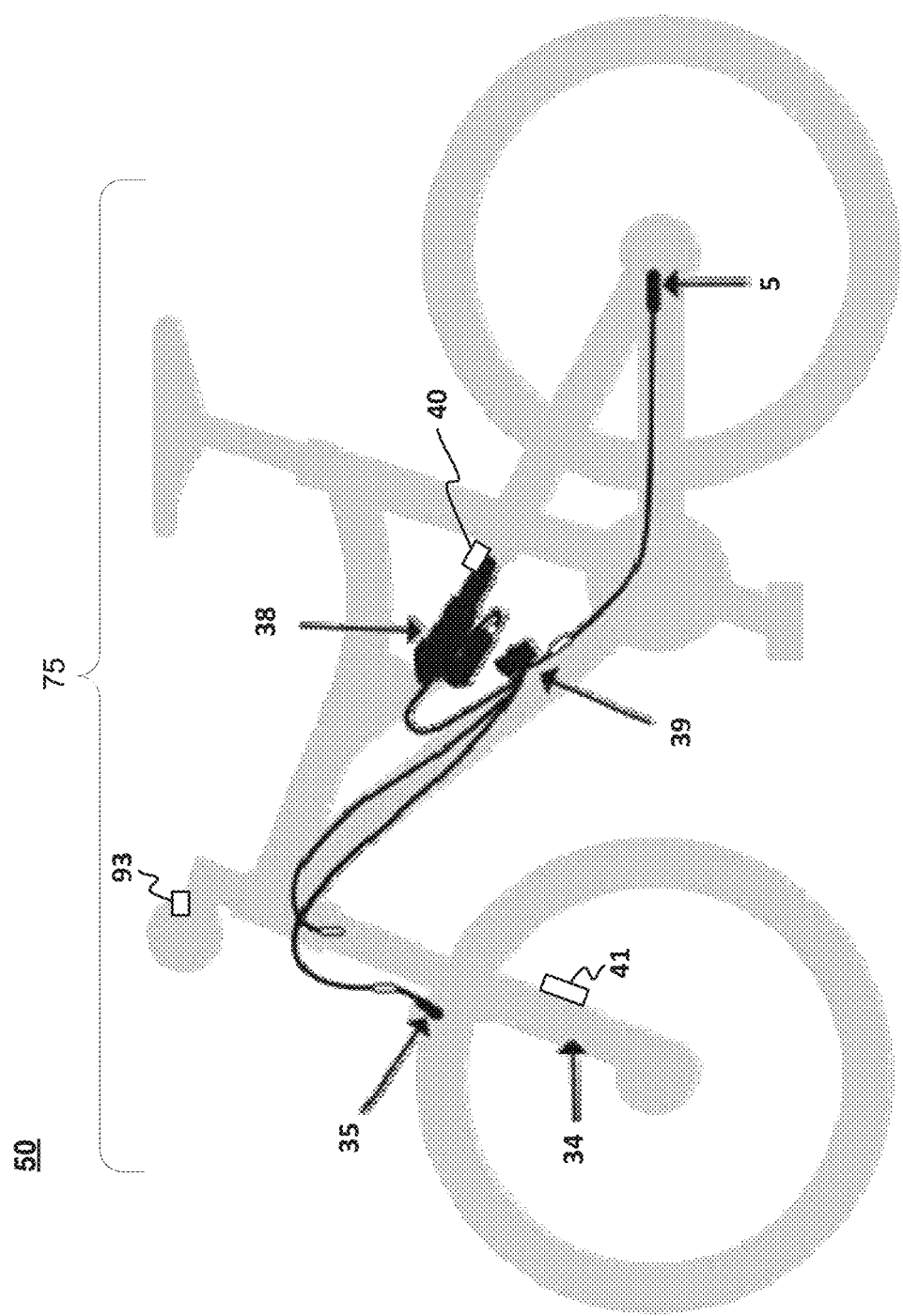
FIG. 1B is a perspective view of an active valve system on a bicycle, in accordance with an embodiment.

FIG. 1B is a perspective view of an active valve system 75 on bicycle 50 having a number of sensors and the switch, in accordance with an embodiment. In one embodiment, switch 93 is similar to that shown in FIG. 1A and described in further detail herein. In general, one or more sensors (e.g., sensor 5, 35, 40, and/or 41) are used for sensing characteristics (or changes to characteristics) such as terrain, environment, temperature, vehicle speed, vehicle pitch, vehicle roll, vehicle yaw, component activity, or the like. It is understood that the one or more sensors may be imbedded, moved, mounted, or the like, in any suitable configuration and allowing for any suitable range of adjustment as may be desirable. Although a number of sensors are shown in FIG. 1B, it should be appreciated that there may be only a single sensor or more than two sensors in operation.

The sensor(s) may be any suitable force or acceleration transducer (e.g. strain gage, Wheatstone bridge, accelerometer, hydraulic, interferometer based, optical, thermal or any suitable combination thereof). The sensor(s) may utilize solid state electronics, electro-mechanical principles or MEMS, or any other suitable mechanisms.

In one embodiment, the one or more of the sensors are a single axis accelerometer, a triaxial accelerometer, a measurement type sensor such as an infrared based time of flight sensor, a radar, 2D and 3D imager, ultrasonic sensor, photoelectric sensor, LiDar, and the like. In one embodiment, the measurement type sensor is a STMicroelectronics sensor and specifically STMicroelectronics sensor model VL53LOX.

In general, a measurement sensor is used to measure distances by projecting a laser light (or sound, etc.) and measuring the reflection. Differences in return times and wavelengths are used to provide distance measurement information. For example, the time of flight sensor mounted on the vehicle is used to measure the distance to the ground in front of the vehicle. In so doing, the time of flight sensor will provide distance data that is used to monitor and detect terrain changes.

In one embodiment, the measurement type sensor continuously and/or repeatedly measures a distance from the sensor to the ground. By monitoring the distance from the sensor to the ground, the measurement type sensor can determine the existence of an upcoming obstacle (e.g., height changes due to holes, bumps, or other obstacles), a shape or abruptness of the obstacle, etc.

For example, in one embodiment, the sensor could be aimed at a point that is approximately 2 feet in front of the bike. In general, by repeatedly measuring the distance from the sensor to the ground in front of the vehicle, any changes in that distance are indicative of an upcoming obstacle.

Although a distance of 2 feet is used in one embodiment, in another embodiment, the distance to the point in front of the bike varies depending upon speed, terrain, and the like. For example, in one embodiment, the distance in front of the bike is defined by user option, factory guidance provided by the damper manufacturer, sensor manufacturer, bike manufacturer, damping system controller manufacturer, or the like.

In operation on a steady surface, the sensor will regularly obtain a time-of-flight of x (plus or minus some nominal value depending upon the type of surface, type of vehicle, the precision/tolerance of the sensor, user or system defined tolerance, or the like). For example, in one embodiment, if a bike with a very tight suspension setup (such as a road bike), is being ridden on a paved road, the nominal value would be slight (e.g., less than a ¼") such that a change in measurement (e.g., a ½" deep pothole) would be larger than the nominal value. In contrast, in one embodiment, if a bike with a suspension setup that is not as tight as the road bike (such as a gravel bike) is being ridden on the road, the nominal value could be larger (e.g., less than 1") such that the change in measurement (e.g., a ½" deep pothole) would not be larger than the nominal value. Furthermore, in one embodiment, if a bike with a longer suspension setup (such as a mountain bike) is being ridden on the road, the nominal value could be even larger (e.g., less than 3") such that the change in measurement (e.g., a 2" deep pothole) would not be larger than the nominal value.

When the sensor obtains a time-of-flight of x+n (where n is a value that is larger than the nominal value) it would mean that a depression (or hole) is detected. Moreover, the size of n would provide information about the depth of the depression, the size of the depression, the geometry (e.g., angle or grade) of the depression, etc.

In contrast, when the sensor obtains a time of flight of x-n, a bump (or rise) is detected. Here, the size of n would provide information about the height of the rise, the size of the rise, the geometry of the rise, etc.

In one embodiment, the n value is preset for the type of active suspension, the terrain type, the vehicle type, the ride type, or the like.

In one embodiment, the sensors of active valve system 75 provide the obtained sensor data to a suspension controller 39 which uses the sensor data to monitor the terrain and make suspension adjustments. In one embodiment, suspension controller 39 makes suspension adjustments to active valve damper 38, a live valve damper in front fork 34, or the like. In one embodiment, suspension controller 39 use the sensor information to recognize when bicycle 50 is climbing, traversing, or descending.

In one embodiment, suspension controller 39 monitors the terrain at a rate of a thousand times per second and make suspension adjustments in a matter of milliseconds. For example, in one embodiment, sensors on the fork, rear axle, and/or main frame read bump input at the wheel and the pitch angle of the bicycle 50, and send the obtained sensor data to the suspension controller 39 at a rate, such as but not limited to, 1,000 times per second. Thus, by placing sensors on the frame and/or proximate both wheels, the suspension controller 39 processes data from the terrain to constantly adjust the suspension for maximum efficiency and control. In one embodiment, suspension controller 39 includes a lithium ion battery as the main user interface and can be charged (e.g., via micro USB) on or off the bicycle 50.

For example, in one embodiment, the time of flight sensor detects a depression in the terrain. The depression data generated by the time of flight sensor is provided to the damping suspension controller 39 which will then compare the measurement data against the nominal value and generate a command to one or more of the active valves to change to the damping setting of one or more dampers when the nominal value is exceeded. For example, a compression damping setting would be softened, a rebound damping speed setting would be increased, etc.

In one embodiment, after detecting the depression, the time of flight sensor detects an upcoming rise in the terrain (e.g., the other side of the depression) and then makes a number of consistent measurements indicating a (relatively) smooth surface. In one embodiment, the rise in the terrain and the return to a constant distance measurement data generated by the time of flight sensor is provided to the damping suspension controller. When the damping suspension controller determines that the obstacle has been passed, in one embodiment, it will generate the command to the active valve to change to the damping setting of the one or more dampers back to the pre-obstacle compression and/or rebound settings. For example, the compression damping setting would be stiffened, the rebound speed setting would be decreased, etc.

In one embodiment, measurement type sensor 41 continuously and/or repeatedly measures a distance from the bicycle fork steerer tube, crown, or other fixed point to the lower stanchion, wheel, fender, ground, or other fixed point. By monitoring the distance between these points, the measurement type sensor can determine the suspension travel used and the speed at which the bicycle fork suspension compressed and rebounded.

In one embodiment, sensor 40 is a measurement type sensor such as an infrared based time of flight sensor and the like. In one embodiment, the measurement type sensor continuously and/or repeatedly measures a distance from the from the bottom shock eyelet, supporting shock substructure, or other fixed point to the top shock eyelet, supporting substructure, or other fixed point. By monitoring the distance between these points, the measurement type sensor can determine the shock suspension travel used and the speed at which the shock suspension compressed and rebounded.

Although four sensors are shown in FIG. 1B, it should be appreciated that there may be only a single sensor or two or more sensors in operation. Moreover, in one embodiment, mobile device 95 may act as a sensor or other component thereby becoming part of the active valve system 75.

Further, it should be appreciated that a sensor on a second vehicle (or any number of linked vehicles) could be providing information to the first vehicle (e.g., bicycle 50). For example, if two riders are riding two bikes within a certain range, the sensors on both bicycles could be communicating wirelessly such that the information from the sensors on the lead bike is also provided to the follow bicycle(s) (or automobiles, motorcycles, ATVs, snowmobiles, water vehicles, and the like). In so doing, the information from the lead vehicle sensor can be used to provide the follow vehicle(s) with proper damper assembly settings.

In one embodiment, the sensors provide the obtained sensor data to suspension controller 39 which processes data from the terrain to constantly adjust the suspension for maximum efficiency and control. In one embodiment, using the sensor's pitch detection, the active valve system 75 can recognize when bicycle 50 climbing, traversing, or descending.

In one embodiment, suspension controller 39 includes a lithium ion battery as the main user interface and can be charged (e.g., via micro USB) on or off the bicycle 50.

In one embodiment, one or a plurality of component(s) of the bicycle 50 are also smart component(s). Examples of the smart component(s) can include one or more of the forks, wheels, rear shocks, front shocks, handlebars, seat posts, pedals, cranks, and the like. In one embodiment, the smart component(s) will include connective features that allow them to communicate wired or wirelessly with suspension controller 39, mobile device 95, one or more sensors, and/or any other smart component(s) within transmission range (thereby becoming connected components). In one embodiment, the sensors, smart components, smart devices, controllers, valves, and the like may be interconnected or connected by (one or a combination of) wire, or wirelessly via systems such as near field communication (NFC), WAN, LAN, Bluetooth, WiFi, ANT, GARMIN® low power usage protocol, or any suitable power or signal transmitting mechanism, making them connected components.

By using a connected component, data (including realtime data) can be collected from the smart component by suspension controller 39. Depending upon the connected component, data such as telemetry attributes to provide angle, orientation, velocity, acceleration, RPM, operating temperature, and the like, can be obtained.

For example, a smart wheel would be a connected component that is attached to the wheel (or wheels) to provide telemetry such as RPM, tire pressure, tire temperature, or the like to suspension controller 39. For example, the smart component could be a smart valve stem, a MEMS device, or the like coupled with the rim of the wheel.

An example of a smart handlebar would be a connected component that provides handlebar geometry information, handlebar dimensions, stress measurements, or the like. For example, the smart component could be a MEMS device coupled with the handlebar.

An example of a smart seat post would be connected component that provides geometry information such as seat height, seat pitch, roll, yaw, seat forward or aft location, weight on the seat, or the like. For example, the smart component could be a MEMS device coupled with the seat post.

An example of a smart pedal would be connected component that provides telemetry such as RPM's, push and pull pressure, left side versus right side performance data (e.g., a stronger force on the right pedal or left pedal, in the up or down direction), or the like. For example, the smart component could be a MEMS device or other sensor type coupled with the pedal(s).

An example of a smart crank set would be connected component that provides telemetry such as RPM's, chain tension, chain temperature, internal crank temperature, bearing operation, or the like. For example, the smart component could be a MEMS device coupled with the crank set.

In one embodiment, one or more sensors on a second vehicle (or any number of linked vehicles) could be providing information to the first vehicle (e.g., bicycle 50). For example, if two riders are riding two bikes within a certain range, the sensor data for both bicycles could be shared wirelessly such that the information from the sensors on the lead bike is also provided to the follow bicycle(s) (or automobiles, motorcycles, ATVs, snowmobiles, water vehicles, and the like). In so doing, data generated by one or more sensors of the lead vehicle (or settings from suspension controller 39) are provided the follow vehicle(s) with proper damper assembly settings. In one embodiment, mobile device 95 is used to provide the wireless connectivity. In one embodiment, suspension controller 39 include wireless communication capabilities to provide information to mobile device 95 or to another suspension controller 39.

Switch

Figure 2A:
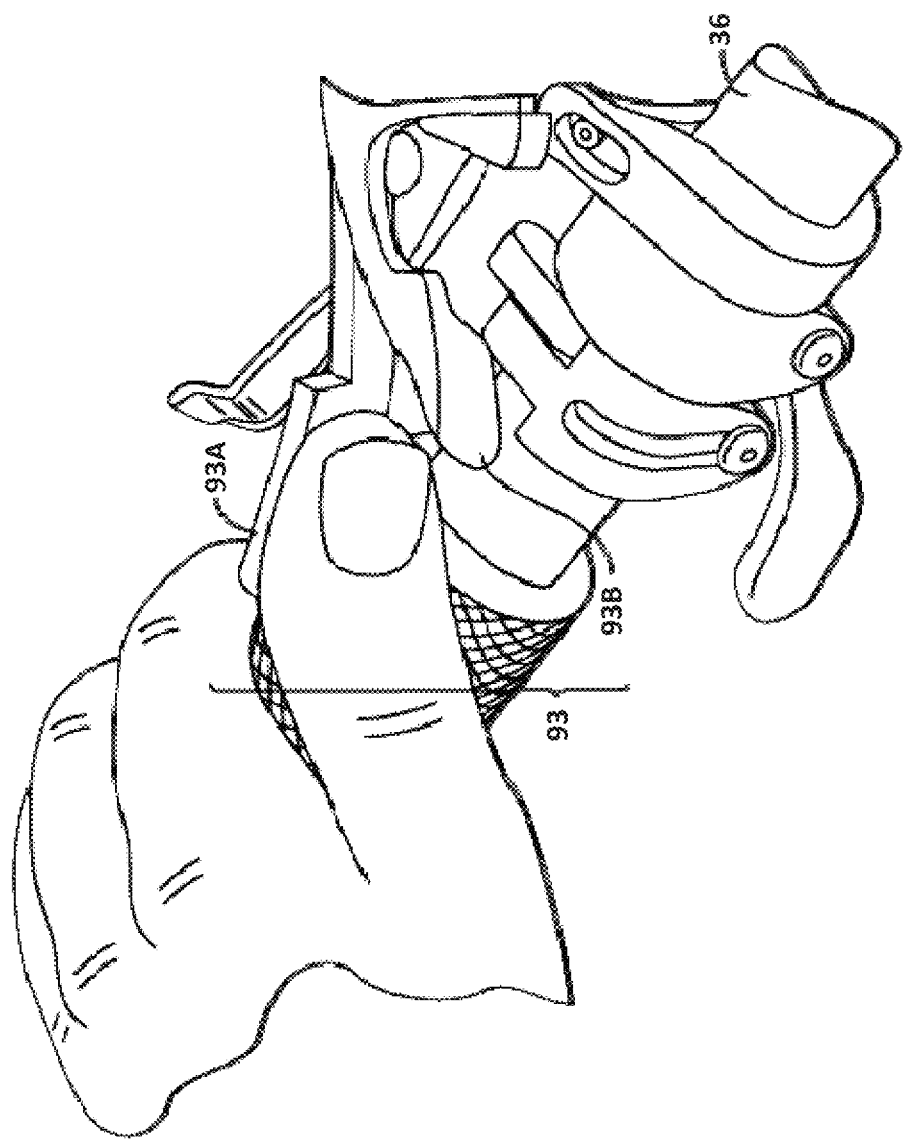
FIG. 2A is a perspective view of a switch for selecting different active valve control tunes, in accordance with an embodiment.

Referring now to FIG. 2A, switch 93 is shown in accordance with one embodiment. In one embodiment, switch 93 is a positional switch used in conjunction with the active valve suspension and the active valve mobile device application (e.g., mobile device application 1124 discussed in further detail herein). In one embodiment, switch 93 is a multi-positional switch, an upshift/downshift type of switch, a button type switch, or the like. For example, switch 93 would be a 2-position switch, a 3-position switch, a switch that can cycle through a number of different active valve suspension tunes (similar to a gear shift), or the like.

In one embodiment, switch 93 is a positional wireless switch to be used in conjunction with active valve suspension and the active valve mobile device application 1124. In one embodiment, the switch 93 could be any of a positional switch, an upshift, downshift type switch, or the like. For example, the switch 93 would be a 2-position switch, a 3-position switch, or the like.

In one embodiment, switch 93 includes a set of control levers 93A and 93B coupled therewith. In one embodiment, control levers 93A and 93B of switch 93 are used to cycle through any number of different options using a selection capability similar to a gear shift configuration, e.g., the rider can change the selected mode based on the number of upshifts, downshifts, (left movements/right movements) or the like. For example, depressing control lever 93A, releasing it, depressing it again, etc., would allow the rider to cycle upward from mode 1 through mode 6 (or mode n). Contrastingly depressing control lever 93B, releasing, depressing it again, etc., would allow the rider to cycle back down through the modes in the opposite direction. In one embodiment, the rider could stop at any of the 6 modes by cycling the control levers 93A and 93B of switch 93.

In one embodiment, the modes tied to the position of the switch could be programmable by the rider, modified by the application 1124, and adjusted at any time. Similarly, in one embodiment, any or all of the rider modes could be assigned by the rider (or by the app) to any number of the up/down shift locations. For example, if the rider had 4 riding modes, the switch 93 could be used to switch up and down through the 4 different modes.

In another embodiment, for example, if the rider has 12 available riding modes, the switch 93 would be able to cycle through all 12 different modes, through a limited number of the modes, or the like. For example, if the switch 93 can only cycle through 5 iterations, then there would only be 5 modes (of the 12) available to be assigned to the 5 different positions. In one embodiment, the modes are designated (or sorted, ranked, located, assigned, or the like) by the rider. In one embodiment, the modes are designated (or sorted, ranked, located, assigned, or the like) automatically by the application. In one embodiment, the automatic assignment is based on any or all of the different automated selection methods discussed herein, such as, but not limited to, on the rider's location, rider's previous mode choices on the same or similar rides, modes selected by a trainer, used on the same or similar ride by a peer, the altitude of the ride, the geography of the ride, the type of the ride (e.g., sprint, hill climb, hill decent, long ride, etc.), the terrain of the ride, the type of bike, one or more features on the bike, etc.

In one embodiment, the rider can use the switch to select between the different modes on the fly. For example, in a three mode configuration, the rider will use switch 93 (or different versions 93C, 93F, and the like) to cycle between sprint/off/auto for the active suspension while riding. In one embodiment, sprint would be full-time firm and might be used when sprinting for a finish line in a race; off would be passive; and auto would be active valve algorithm operating normally.

As discussed herein, in one embodiment, the rider will select the function of the three positions of the switch 93 within the mobile device application 1124 and the action of the switch 93 will cause the setting to change using any of the setting changing methods discussed herein, or other setting changing methods capabilities, such as wirelessly, through the mobile device 95, through the button and screen (as shown in switch 93C) using one or a combination of wired and/or wireless communications, or the like.

Referring still to FIG. 2A, in one embodiment, switch 93 is wireless. For example, switch 93 would communicate with mobile device 95, controller 39, and/or other active or semi-active components, via Bluetooth, NFC, WiFi, a hotspot, a cellular network, WAN, LAN, ANT, GARMIN® low power usage protocol, any suitable power or signal transmitting mechanism, another type of wireless communications protocol, or the like.

In one embodiment, switch 93 could be wired and could communicate with mobile device 95, controller 39, and/or other active or semi-active components by way of an input port such as USB, micro USB, or any other connectable wired configuration. In one embodiment, switch 93 could have both wired and wireless communication capabilities.

In one embodiment, switch 93 is a type of user interface with which the user employs for communicating with mobile device 95 and/or controller 39. Of note, switch 93 is used herein to describe various embodiments of user interfaces including, but not limited to, those shown in FIGS. 2B and 2C.

Although switch 93 is shown mounted to handlebar assembly 36 in one embodiment, it should be appreciated that switch 93 could be mounted in a different location on the vehicle, on a mount coupled to the vehicle, or the like. In one embodiment, the location of switch 93 is modifiable and is located on the vehicle based on a rider's preference. For example, in one embodiment, switch 93 is mounted on a different portion of the vehicle such as main frame 24. In one embodiment, switch 93 is worn by a rider such as on an arm/wrist/hand, like a watch, glove, etc., on a thigh wrap, or the like. In one embodiment, switch 93 is carried in a pocket, or the like.

In one embodiment, switch 93 includes at least one control lever, such as the first control lever 93A and may include a second control lever 93B, it should be understood that in an embodiment, there may be only a single control lever, or in an embodiment there may be a set of control levers. In general, switch 93 is mechanically and/or electronically connected (via wire/cable and/or wirelessly) to mobile device 95 and/or controller 39 and/or various active, or semi-active components on bicycle 50.

Another example of handlebar switches/control levers that could be used in accordance with one embodiment is found in U.S. Pat. No. 9,650,094 entitled "Lever Assembly For Positive Lock Adjustable Seat Post" which is assigned to the assignee of the present application, and which is incorporated herein by reference in its entirety.

With reference now to FIG. 2B, a top view of a switch 93C with a display 718 is shown in accordance with an embodiment. In this discussion, the identification of the switch of FIG. 2B as switch 93C is merely used for clarification of reference to the different switch embodiments shown in the Figures. However, it should be understood that switch 93C is similar in function to switch 93, e.g., for selecting different active valve control tunes. In one embodiment, switch 93C includes one or more buttons 93E and 93F which are used to toggle/change the switch options or selected tune.

Although two buttons are shown, in one embodiment, one or three or more buttons are used with switch 93C. The use of two buttons is one embodiment. In one embodiment, display 718 of switch 93C is used to provide visual feedback to a rider. For example, the display 718 of switch 93C could provide information about the presently active suspension tune, provide a menu as described herein for helping a user to select and activate a different suspension tune, and the like.

Although switch 93C is shown mounted to handlebar assembly 36 in one embodiment, it should be appreciated that switch 93C could be mounted in a different location on the vehicle, on a mount coupled to the vehicle, or the like. In one embodiment, the location of switch 93C is modifiable and is located on the vehicle based on a rider's preference. For example, in one embodiment, switch 93C is mounted on a different portion of the vehicle such as main frame 24. In one embodiment, switch 93C is worn by a rider such as on an arm/wrist/hand, like a watch, glove, etc., on a thigh wrap, or the like. In one embodiment, switch 93C is carried in a pocket, or the like.

Referring now to FIG. 2C, a perspective view of a button 93G type switch 93F for selecting different active valve control tunes is shown in accordance with an embodiment. In this discussion, the identification of the switch of FIG. 2C as switch 93F is merely used for clarification of reference to the different switch embodiments shown in the Figures. However, it should be understood that switch 93F is similar in function to switch 93, e.g., for selecting different active valve control tunes. In one embodiment, switch 93F includes one or more button(s) 93G which is used to toggle/change the switch options or selected tune. Although a single button 93G is shown, in one embodiment, two or more buttons are used with switch 93F. The use of one button 93G is one embodiment.

Although switch 93F is shown mounted to handlebar assembly 36 in one embodiment, it should be appreciated that switch 93F could be mounted in a different location on the vehicle, on a mount coupled to the vehicle, or the like. In one embodiment, the location of switch 93F is modifiable and is located on the vehicle based on a rider's preference. For example, in one embodiment, switch 93F is mounted on a different portion of the vehicle such as main frame 24. In one embodiment, switch 93F is worn by a rider such as on an arm/wrist/hand, like a watch, glove, etc., on a thigh wrap, or the like. In one embodiment, switch 93F is carried in a pocket, or the like.

Figure 3:
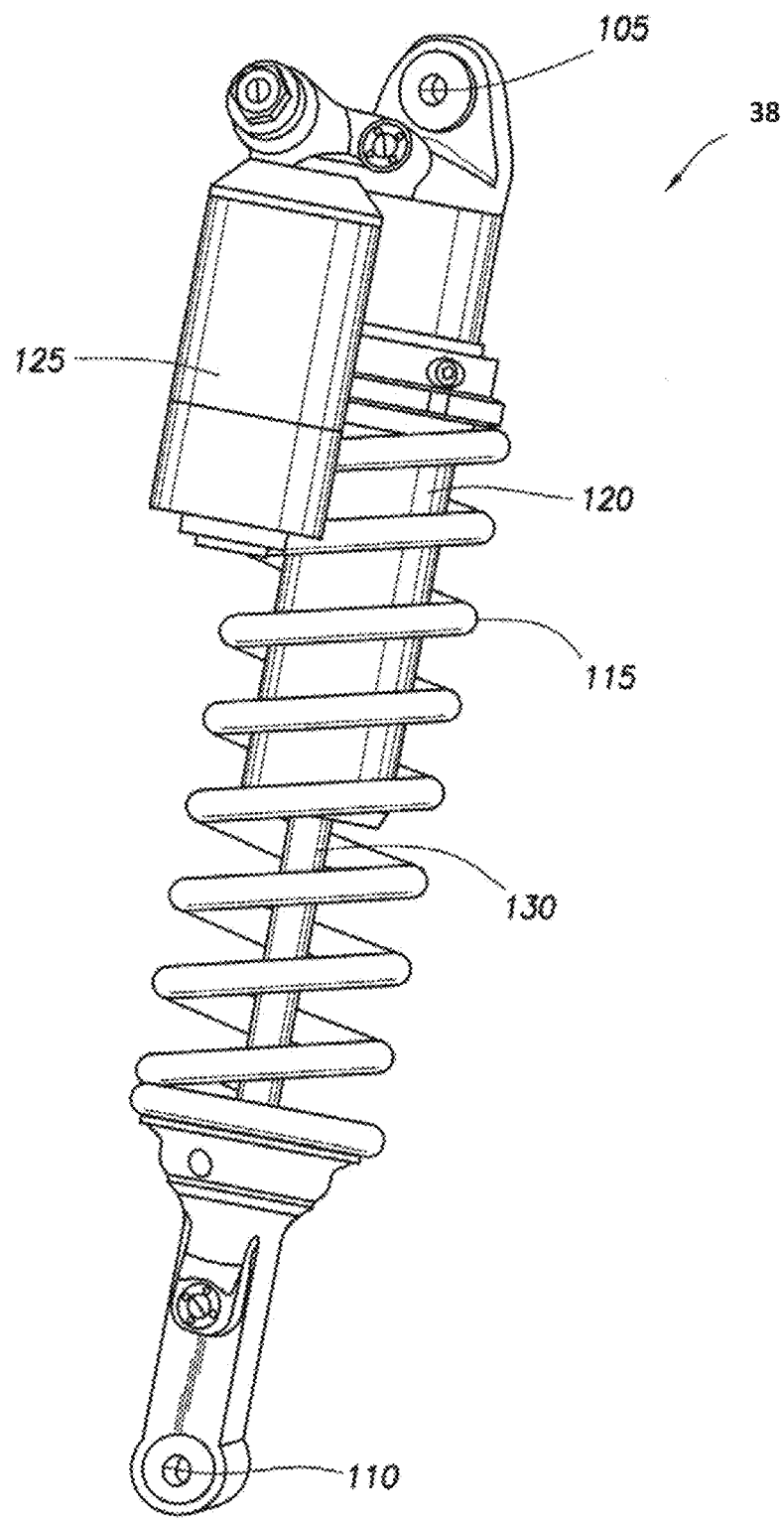
FIG. 3 is a perspective view of a rear damping assembly including a damper, external reservoir, and helical spring, in accordance with an embodiment.

Referring now to FIG. 3, a perspective view of an active valve damper 38 is shown in accordance with one embodiment. In one embodiment, active valve damper 38 includes eyelets 105 and 110, damper housing 120, helical spring 115, piston shaft 130, and piggyback (or external reservoir 125). In one embodiment, external reservoir 125 is described in U.S. Pat. No. 7,374,028 the content of which is entirely incorporated herein by reference.

In one embodiment, the damper housing 120 includes a piston and chamber and the external reservoir 125 includes a floating piston and pressurized gas to compensate for a reduction in volume in the main damper chamber of the damping assembly 38 as the piston shaft 130 moves into the damper body. Fluid communication between the main chamber of the damper and the external reservoir 125 may be via a flow channel including an adjustable needle valve. In its basic form, the damper works in conjunction with the helical spring and controls the speed of movement of the piston shaft by metering incompressible fluid from one side of the damper piston to the other, and additionally from the main chamber to the reservoir, during a compression stroke (and in reverse during the rebound or extension stroke).

Although a coil sprung damping assembly is shown in FIG. 3, this is provided as one embodiment and for purposes of clarity. In one embodiment, the active valve damper 38 could be a different type such as, but not limited to, an air sprung fluid damper assembly, a stand-alone fluid damper assembly, and the like.

Example Active Valve

Figure 4:
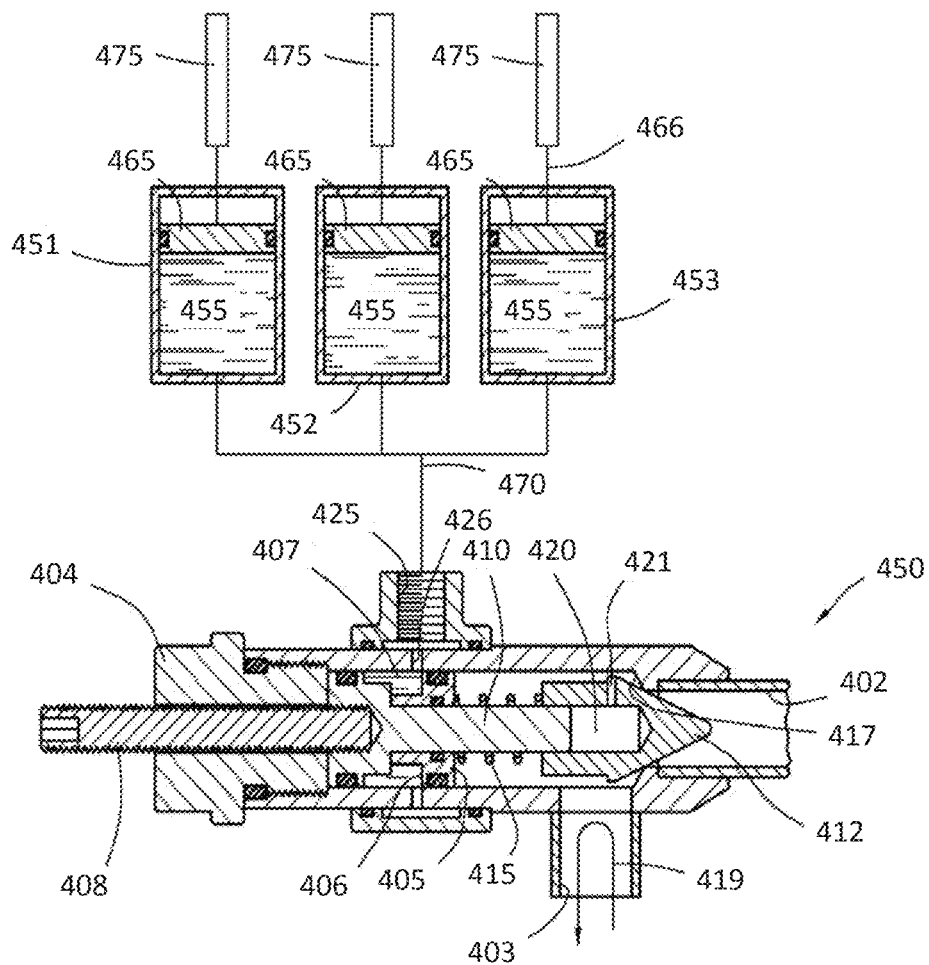
FIG. 4 is a schematic view of an active valve and a plurality of valve operating cylinders in selective communication with an annular piston surface of the active valve, in accordance with an embodiment.

Referring now to FIG. 4, a schematic view of an active valve 450 is shown in accordance with an embodiment. Although FIG. 4 shows the active valve 450 in a closed position (e.g. during a rebound stroke of the damper), the following discussion also includes the opening of active valve 450. Active valve 450 includes a valve body 404 housing a movable piston 405 which is sealed within the body. The piston 405 includes a sealed chamber 407 adjacent an annular piston surface 406 at a first end thereof. The chamber 407 and annular piston surface 406 are in fluid communication with a port 425 accessed via opening 426. Two additional fluid communication points are provided in the body including orifice 402 and orifice 403 for fluid passing through the active valve 450.

Extending from a first end of the piston 405 is a shaft 410 having a cone shaped member 412 (other shapes such as spherical or flat, with corresponding seats, will also work suitably well) disposed on an end thereof. The cone shaped member 412 is telescopically mounted relative to, and movable on, the shaft 410 and is biased toward an extended position due to a spring 415 coaxially mounted on the shaft 410 between the cone shaped member 412 and the piston 405. Due to the spring biasing, the cone shaped member 412 normally seats itself against a valve seat 417 formed in an interior of the valve body 404.

As shown, the cone shaped member 412 is seated against valve seat 417 due to the force of the spring 415 and absent an opposite force from fluid entering the active valve 450 along orifice 402. As cone shaped member 412 telescopes out, a gap 420 is formed between the end of the shaft 410 and an interior of cone shaped member 412. A vent 421 is provided to relieve any pressure formed in the gap. With a fluid path through the active valve 450 (from 403 to 402) closed, fluid communication is substantially shut off from the rebound side of the cylinder into the valve body (and hence to the compression side) and its "dead-end" path is shown by arrow 419.

In one embodiment, there is a manual pre-load adjustment on the spring 415 permitting a user to hand-load or un-load the spring using a threaded member 408 that transmits motion of the piston 405 towards and away from the conical member, thereby changing the compression on the spring 415.

Also shown in FIG. 4 is a plurality of valve operating cylinders 451, 452, 453. In one embodiment, the cylinders each include a predetermined volume of fluid 455 that is selectively movable in and out of each cylindrical body through the action of a separate corresponding piston 465 and rod 466 for each cylindrical body. A fluid path 470 runs between each cylinder and port 425 of the valve body where annular piston surface 406 is exposed to the fluid.

Because each cylinder has a specific volume of substantially incompressible fluid and because the volume of the sealed chamber 407 adjacent the annular piston surface 406 is known, the fluid contents of each cylinder can be used, individually, sequentially or simultaneously to move the piston a specific distance, thereby effecting the damping characteristics of the system in a relatively predetermined and precise way.

While the cylinders 451-453 can be operated in any fashion, in the embodiment shown each piston 465 and rod 466 is individually operated by a solenoid 475 and each solenoid, in turn, is operable from a remote location of the vehicle, like a cab of a motor vehicle or even the handlebar area of a motor or bicycle (not shown). Electrical power to the solenoids 475 is available from an existing power source of a vehicle or is supplied from its own source, such as on-board batteries. Because the cylinders may be operated by battery or other electric power or even manually (e.g. by syringe type plunger), there is no requirement that a so-equipped suspension rely on any pressurized vehicle hydraulic system (e.g. steering, brakes) for operation. Further, because of the fixed volume interaction with the bottom out valve there is no issue involved in stepping from hydraulic system pressure to desired suspension bottom out operating pressure.

In one embodiment, e.g., when active valve 450 is in the damping-open position, fluid flow through orifice 402 provides adequate force on the cone shaped member 412 to urge it backwards, at least partially loading the spring 415 and creating a fluid flow path from the orifice 402 into and through orifice 403.

The characteristics of the spring 415 are typically chosen to permit active valve 450 to open at a predetermined pressure, with a predetermined amount of control pressure applied to port 425. For a given spring 415, higher control pressure at port 425 will result in higher pressure required to open the active valve 450 and correspondingly higher damping resistance in orifice 402. In one embodiment, the control pressure at port 425 is raised high enough to effectively "lock" the active valve closed resulting in a substantially rigid compression damper (particularly true when a solid damping piston is also used).

In one embodiment, the valve is open in both directions when the cone shaped member 412 is "topped out" against valve body 404. In another embodiment however, when the piston 405 is abutted or "topped out" against valve body 404 the spring 415 and relative dimensions of the active valve 450 still allow for the cone shaped member 412 to engage the valve seat 417 thereby closing the valve. In such embodiment backflow from the rebound side to the compression side is always substantially closed and cracking pressure from flow along orifice 402 is determined by the pre-compression in the spring 415. In such embodiment, additional fluid pressure may be added to the inlet through port 425 to increase the cracking pressure for flow along orifice 402 and thereby increase compression damping. It is generally noteworthy that while the descriptions herein often relate to compression damping and rebound shut off, some or all of the channels (or channel) on a given suspension unit may be configured to allow rebound damping and shut off or impede compression damping.

While the examples illustrated relate to manual operation and automated operation based upon specific parameters, in various embodiments, active valve 450 can be remotely-operated and can be used in a variety of ways with many different driving and road variables and/or utilized at any point during use of a vehicle. In one example, active valve 450 is controlled based upon vehicle speed in conjunction with the angular location of the vehicle's steering wheel. In this manner, by sensing the steering wheel turn severity (angle of rotation and rotational velocity), additional damping (by adjusting the corresponding size of the opening of orifice 402 by causing cone shaped member 412 to open, close, or partially close orifice 402) can be applied to one shock absorber or one set of vehicle shock absorbers on one side of the vehicle (suitable for example to mitigate cornering roll) in the event of a sharp turn at a relatively high speed.

In another example, a transducer, such as an accelerometer, measures other aspects of the vehicle's suspension system, like axle force and/or moments applied to various parts of the vehicle, like steering tie rods, and directs change to position of active valve 450 (and corresponding change to the working size of the opening of orifice 402 by causing cone shaped member 412 to open, close, or partially close orifice 402) in response thereto. In another example, active valve 450 is controlled at least in part by a pressure transducer measuring pressure in a vehicle tire and adding damping characteristics to some or all of the wheels (by adjusting the working size of the opening of orifice 402 by causing cone shaped member 412 to open, close, or partially close orifice 402) in the event of, for example, an increased or decreased pressure reading.

In one embodiment, active valve 450 is controlled in response to braking pressure (as measured, for example, by a brake pedal (or lever) sensor or brake fluid pressure sensor or accelerometer). In still another example, a parameter might include a gyroscopic mechanism that monitors vehicle trajectory and identifies a "spin-out" or other loss of control condition and adds and/or reduces damping to some or all of the vehicle's dampers (by adjusting the working size of the opening of orifice 402 by causing cone shaped member 412 to open, close, or partially close orifice 402 chambers) in the event of a loss of control to help the operator of the vehicle to regain control.

For example, active valve 450, when open, permits a first flow rate of the working fluid through orifice 402. In contrast, when active valve 450 is partially closed, a second flow rate of the working fluid though orifice 402 occurs. The second flow rate is less than the first flow rate but greater than no flow rate. When active valve 450 is completely closed, the flow rate of the working fluid though orifice 402 is statistically zero.

In one embodiment, instead of (or in addition to) restricting the flow through orifice 402, active valve 450 can vary a flow rate through an inlet or outlet passage within the active valve 450, itself. See, as an example, the electronic valve of FIGS. 2-4 of U.S. Pat. No. 9,353,818 which is incorporated by reference herein, in its entirety, as further example of different types of "electronic" or "active"

valves). Thus, the active valve 450, can be used to meter the working fluid flow (e.g., control the rate of working fluid flow) with/or without adjusting the flow rate through orifice 402.

Due to the active valve 450 arrangement, a relatively small solenoid (using relatively low amounts of power) can generate relatively large damping forces. Furthermore, due to incompressible fluid inside the active valve damper 38, damping occurs as the distance between cone shaped member 412 and orifice 402 is reduced. The result is a controllable damping rate. Certain active valve features are described and shown in U.S. Pat. Nos. 9,120,362; 8,627,932; 8,857,580; 9,033,122; and 9,239,090 which are incorporated herein, in their entirety, by reference.

It should be appreciated that when the valve body 404 rotates in a reverse direction than that described above and herein, the cone shaped member 412 moves away from orifice 402 providing at least a partially opened fluid path.

Figure 5:
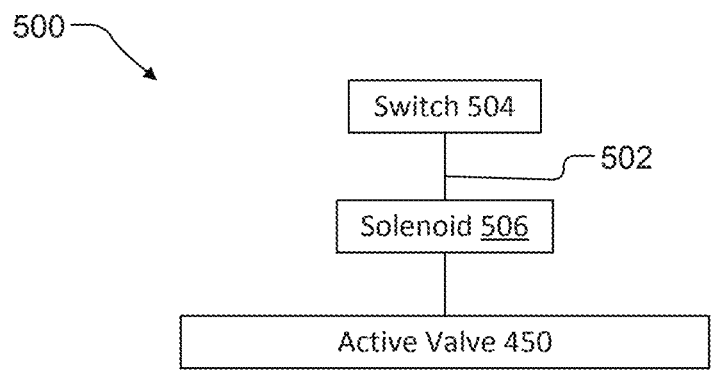
FIG. 5 is a flow diagram showing a control arrangement for an active valve, in accordance with an embodiment.

FIG. 5 is a flow diagram of a control arrangement 500 for a remotely-operated active valve 450. As illustrated, a signal line 502 runs from a switch 504 to a solenoid 506. Thereafter, the solenoid 506 converts electrical energy into mechanical movement and rotates valve body 404 within active valve 450, In one embodiment, the rotation of valve body 404 causes an indexing ring consisting of two opposing, outwardly spring-biased balls to rotate among indentions formed on an inside diameter of a lock ring.

As the valve body 404 rotates, cone shaped member 412 at an opposite end of the valve is advanced or withdrawn from an opening in orifice 402. For example, the valve body 404 is rotationally engaged with the cone shaped member 412. A male hex member extends from an end of the valve body 404 into a female hex profile bore formed in the cone shaped member 412. Such engagement transmits rotation from the valve body 404 to the cone shaped member 412 while allowing axial displacement of the cone shaped member 412 relative to the valve body 404. Therefore, while the body does not axially move upon rotation, the threaded cone shaped member 412 interacts with mating threads formed on an inside diameter of the bore to transmit axial motion, resulting from rotation and based on the pitch of the threads, of the cone shaped member 412 towards or away from an orifice 402, between a closed position, a partially open position, and a fully or completely open position.

Adjusting the opening of orifice 402 modifies the flowrate of the fluid through active valve 450 thereby varying the stiffness of a corresponding active valve damper 38. While FIG. 5 is simplified and involves control of a single active valve 450, it will be understood that any number of active valves corresponding to any number of fluid channels (e.g., bypass channels, external reservoir channels, bottom out channels, etc.) for a corresponding number of vehicle suspension dampers could be used alone or in combination. That is, one or more active valves could be operated simultaneously or separately depending upon needs in a vehicular suspension system.

For example, a suspension damper could have one, a combination of, or each of an active valve(s). The active valve(s) could be used for fluid flow path control, for bottom out control, for an internal bypass, for an external bypass, for a fluid conduit to the external reservoir 125, etc. In other words, anywhere there is a fluid flow path within active valve damper 38, an active valve could be used. Moreover, the active valve could be alone or used in combination with other active (semi-active, or passive) valves at other fluid flow paths to automate one or more of the damping performance characteristics of the damping assembly. Moreover, additional switches could permit individual operation of separate active bottom out valves.

In addition to, or in lieu of, the simple, switch-operated remote arrangement of FIG. 5, the remotely-operable active valve 450 can be operated automatically based upon one or more driving conditions, and/or automatically or manually utilized at any point during use of a vehicle.

Figure 6:
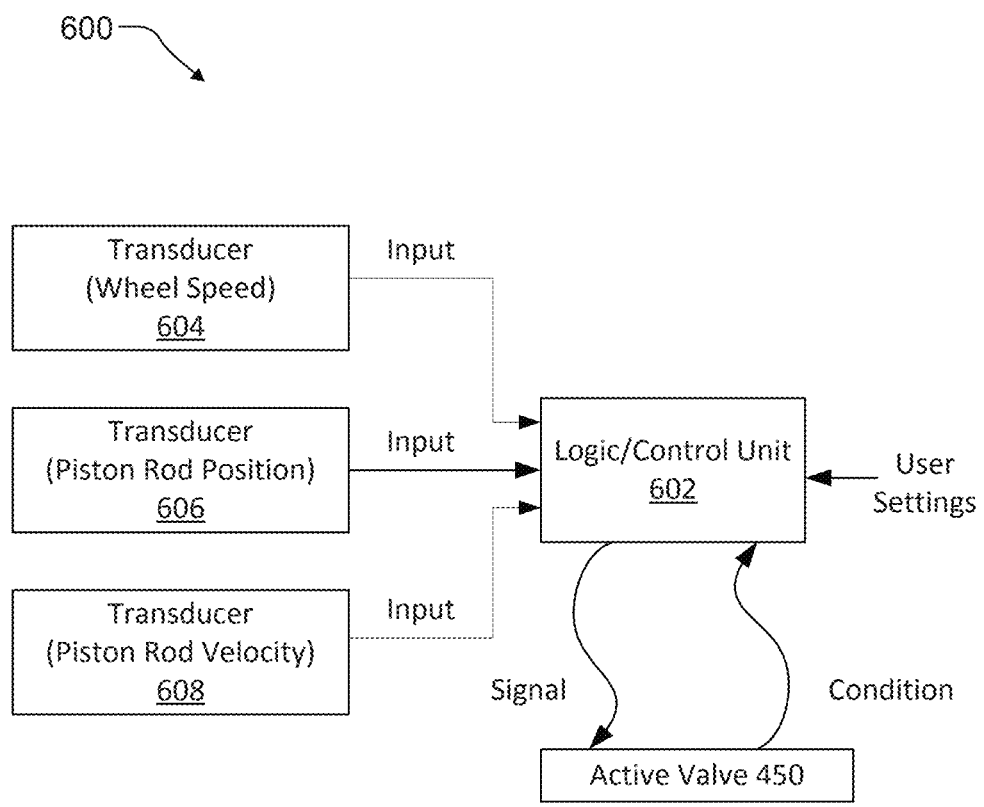
FIG. 6 is a flow diagram of a control system based upon any or all of vehicle speed, damper rod speed, and damper rod position, in accordance with an embodiment.

FIG. 6 is a flow diagram of a control system 600 based upon any or all of vehicle speed, damper rod speed, and damper rod position. One embodiment of the arrangement of control system 600 is designed to automatically increase damping in a shock absorber in the event a damper rod reaches a certain velocity in its travel towards the bottom end of a damper at a predetermined speed of the vehicle.

In one embodiment, the control system 600 adds damping (and control) in the event of rapid operation (e.g. high rod velocity) of the active valve damper 38 to avoid a bottoming out of the damper rod as well as a loss of control that can accompany rapid compression of a shock absorber with a relative long amount of travel. In one embodiment, the control system 600 adds damping (e.g., adjusts the size of the opening of orifice 402 by causing cone shaped member 412 to open, close, or partially close orifice 402) in the event that the rod velocity in compression is relatively low but the rod progresses past a certain point in the travel.

Such configuration aids in stabilizing the vehicle against excessive low-rate suspension movement events such as cornering roll, braking and acceleration yaw and pitch and "g-out."

FIG. 6 illustrates, for example, a control system 600 including three variables: wheel speed, corresponding to the speed of a vehicle component (measured by wheel speed transducer 604), piston rod position (measured by piston rod position transducer 606), and piston rod velocity (measured by piston rod velocity transducer 608). Any or all of the variables shown may be considered by logic unit 602 in controlling the solenoids or other motive sources coupled to active valve 450 for changing the working size of the opening of orifice 402 by causing cone shaped member 412 to open, close, or partially close orifice 402. Any other suitable vehicle operation variable may be used in addition to or in lieu of the variables discussed herein, such as, for example, piston rod compression strain, eyelet strain, vehicle mounted accelerometer (or tilt/inclinometer) data or any other suitable vehicle or component performance data.

In one embodiment, the piston's position within the damping chamber is determined using an accelerometer to sense modal resonance of the suspension damper or other connected suspension element such as the tire, wheel, or axle assembly. Such resonance will change depending on the position of the piston and an on-board processor (computer) is calibrated to correlate resonance with axial position. In one embodiment, a suitable proximity sensor or linear coil transducer or other electro-magnetic transducer is incorporated in the damping chamber to provide a sensor to monitor the position and/or speed of the piston (and suitable magnetic tag) with respect to a housing of the suspension damper.

In one embodiment, the magnetic transducer includes a waveguide and a magnet, such as a doughnut (toroidal) magnet that is joined to the cylinder and oriented such that the magnetic field generated by the magnet passes through the rod and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines.

By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, which is digital or analog, proportional to the calculated distance and/or velocity. A transducer-operated arrangement for measuring piston rod speed and velocity is described in U.S. Pat. No. 5,952,823 and that patent is incorporated by reference herein in its entirety.

While transducers located at the suspension damper measure piston rod velocity (piston rod velocity transducer 608), and piston rod position (piston rod position transducer 606), a separate wheel speed transducer 604 for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 6, the logic unit 602 with user-definable settings receives inputs from piston rod position transducer 606, piston rod velocity transducer 608, as well as wheel speed transducer 604. Logic unit 602 is user-programmable and, depending on the needs of the operator, logic unit 602 records the variables and, then, if certain criteria are met, logic unit 602 sends its own signal to active valve 450 (e.g., the logic unit 602 is an activation signal provider) to cause active valve 450 to move into the desired state (e.g., adjust the flow rate by adjusting the distance between cone shaped member 412 and orifice 402). Thereafter, the condition, state, or position of active valve 450 is relayed back to logic unit 602 via an active valve monitor or the like.

In one embodiment, logic unit 602 shown in FIG. 6 assumes a single active valve 450 corresponding to orifice 402 of active valve damper 38, but logic unit 602 is usable with any number of active valves or groups of active valves corresponding to any number of orifices, or groups of orifices. For instance, the suspension dampers on one side of the vehicle can be acted upon while the vehicles other suspension dampers remain unaffected.

Figure 7:
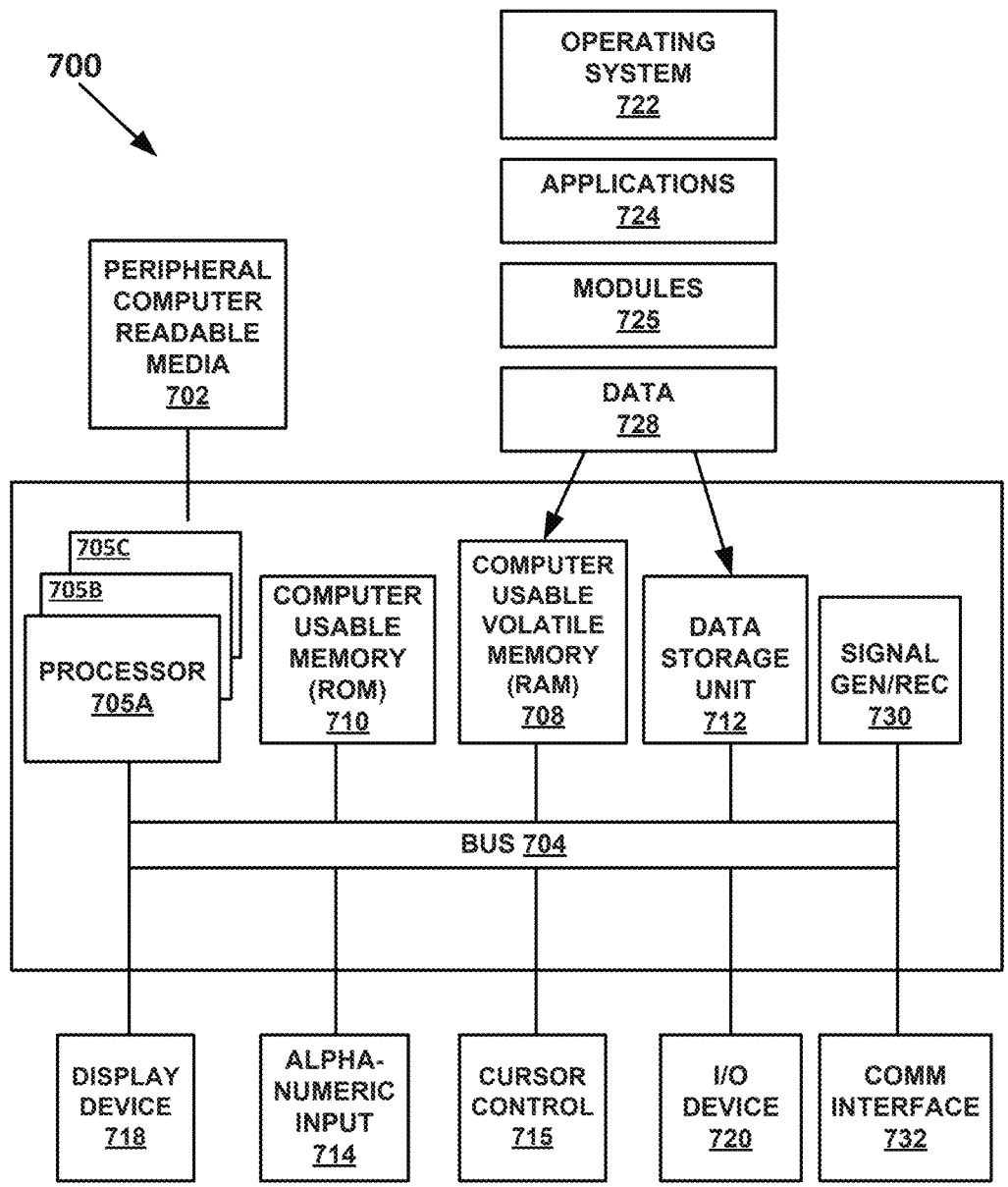
FIG. 7 is block diagram of an example computer system with which or upon which various embodiments of the present invention may be implemented.

With reference now to FIG. 7, an example computer system 700 is shown. In the following discussion, computer system 700 is representative of a system or components that may be used with aspects of the present technology. In one embodiment, different computing environments will only use some of the components shown in computer system 700.

In general, suspension controller 39 can include some or all of the components of computer system 700. In different embodiments, suspension controller 39 can include communication capabilities (e.g., wired such as ports or the like, and/or wirelessly such as near field communication, Bluetooth, WiFi, or the like) such that some of the components of computer system 700 are found on suspension controller 39 while other components could be ancillary but communicatively coupled thereto (such as a mobile device, tablet, computer system or the like). For example, in one embodiment, suspension controller 39 can be communicatively coupled to one or more different computing systems to allow a user (or manufacturer, tuner, technician, etc.) to adjust or modify any or all of the programming stored in suspension controller 39. In one embodiment, the programming includes computer-readable and computer-executable instructions that reside, for example, in non-transitory computer-readable medium (or storage media, etc.) of suspension controller 39 and/or computer system 700.

In one embodiment, computer system 700 includes an address/data/control bus 704 for communicating information, and a processor 705A coupled to bus 704 for processing information and instructions. As depicted in FIG. 7, computer system 700 is also well suited to a multi-processor environment in which a plurality of processors 705A, 705B, and 705C are present. Conversely, computer system 700 is also well suited to having a single processor such as, for example, processor 705A. Processors 705A, 705B, and 705C may be any of various types of microprocessors. Computer system 700 also includes data storage features such as a computer usable volatile memory 708, e.g., random access memory (RAM), coupled to bus 704 for storing information and instructions for processors 705A, 705B, and 705C.

Computer system 700 also includes computer usable non-volatile memory 710, e.g., read only memory (ROM), coupled to bus 704 for storing static information and instructions for processors 705A, 705B, and 705C. Also present in computer system 700 is a data storage unit 712 (e.g., a magnetic disk drive, optical disk drive, solid state drive (SSD), and the like) coupled to bus 704 for storing information and instructions. Computer system 700 also can optionally include an alpha-numeric input device 714 including alphanumeric and function keys coupled to bus 704 for communicating information and command selections to processor 705A or processors 705A, 705B, and 705C. Computer system 700 also can optionally include a cursor control device 715 coupled to bus 704 for communicating user input information and command selections to processor 705A or processors 705A, 705B, and 705C. Cursor control device may be a touch sensor, gesture recognition device, and the like. Computer system 700 of the present embodiment can optionally include a display device 718 coupled to bus 704 for displaying information.

Referring still to FIG. 7, display device 718 can be a liquid crystal device, cathode ray tube, OLED, plasma display device or other display device suitable for creating graphic images and alpha-numeric characters recognizable to a user. Cursor control device 715 allows the computer user to dynamically signal the movement of a visible symbol (cursor) on a display screen of display device 718. Many implementations of cursor control device 715 are known in the art including a trackball, mouse, touch pad, joystick, non-contact input, gesture recognition, voice commands, bio recognition, and the like. In addition, special keys on alpha-numeric input device 714 capable of signaling movement of a given direction or manner of displacement. Alternatively, it will be appreciated that a cursor can be directed and/or activated via input from alpha-numeric input device 714 using special keys and key sequence commands.

Computer system 700 is also well suited to having a cursor directed by other means such as, for example, voice commands. Computer system 700 also includes an I/O device 720 for coupling computer system 700 with external entities. For example, in one embodiment, I/O device 720 is a modem for enabling wired or wireless communications between computer system 700 and an external network such as, but not limited to, the Internet or intranet. A more detailed discussion of the present technology is found below.

Referring still to FIG. 7, various other components are depicted for computer system 700. Specifically, when present, an operating system 722, applications 724, modules 725, and data 728 are shown as typically residing in one or some combination of computer usable volatile memory 708, e.g. random-access memory (RAM), and data storage unit 712. However, it is appreciated that in some embodiments, operating system 722 may be stored in other locations such as on a network or on a flash drive; and that further, operating system 722 may be accessed from a remote location via, for example, a coupling to the Internet. The present technology may be applied to one or more elements of described computer system 700.

Computer system 700 also includes one or more signal generating and receiving device(s) 730 coupled with bus 704 for enabling computer system 700 to interface with other electronic devices and computer systems. Signal generating and receiving device(s) 730 of the present embodiment may include wired serial adaptors, modems, and network adaptors, wireless modems, and wireless network adaptors, and other such communication technology. The signal generating and receiving device(s) 730 may work in conjunction with one (or more) communication interface 732 for coupling information to and/or from computer system 700. Communication interface 732 may include a serial port, parallel port, Universal Serial Bus (USB), Ethernet port, Bluetooth, thunderbolt, near field communications port, WiFi, Cellular modem, or other input/output interface. Communication interface 732 may physically, electrically, optically, or wirelessly (e.g., via radio frequency) couple computer system 700 with another device, such as a mobile phone, radio, or computer system.

Figure 8:
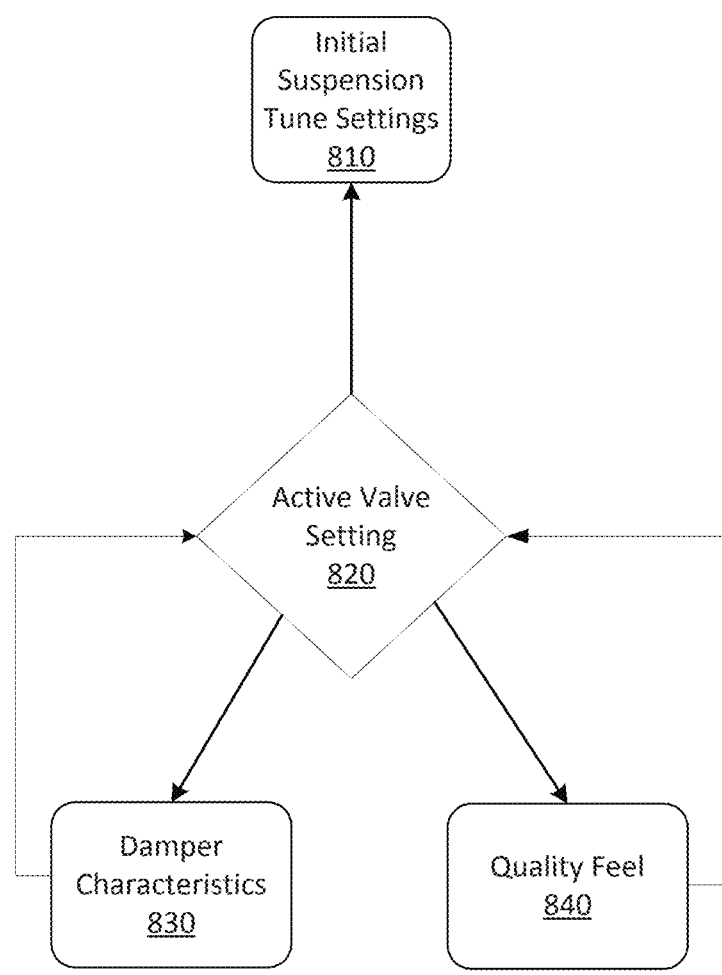
FIG. 8 is a flowchart of an embodiment for an active bottom out valve operation scheme, in accordance with an embodiment.

FIG. 8 is a flowchart 800 of an example method of operational incorporation for an active valve 450 operation in accordance with an embodiment. In one embodiment, during tuning of a suspension, the ride zone portion of the active valve damper 38 has a given range. This range can be adjusted by hardening or softening the damping assembly 38 settings in one or both of compression and rebound.

In one embodiment, by utilizing at least one active valve 450 in active valve damper 38, the tuning of the damping characteristics of the ride zone portion can be electronically varied based on terrain and/or rider behavior, etc.

At 810, the initial active valve suspension tune setting is established (as discussed in further detail in the tune section herein). At 820, the active valve 450 is checked (as described in detail in FIGS. 5-7) for its present damping characteristic settings and is adjusted as needed.

At 830, the damper characteristics are established for the active tune and the damping of active valve 450 is adjusted accordingly.

At 840, the quality feel is evaluated and the damping of active valve 450 can be adjusted based on the quality feel.

Although one embodiment of a flowchart 800 is shown, it should be appreciated that the flowchart 800 could be similarly utilized by each of a plurality of active valves within the active valve damper 38; by every of a plurality of active valves within the active valve damper 38; by an active valve in each of a plurality of damping assemblies within a vehicle suspension; by a plurality of active valves in a plurality of damping assemblies within a vehicle suspension; by every active valve in a plurality of damping assemblies within a vehicle suspension; and by every active valve in every active valve damper 38 within a vehicle suspension.

Figure 9:
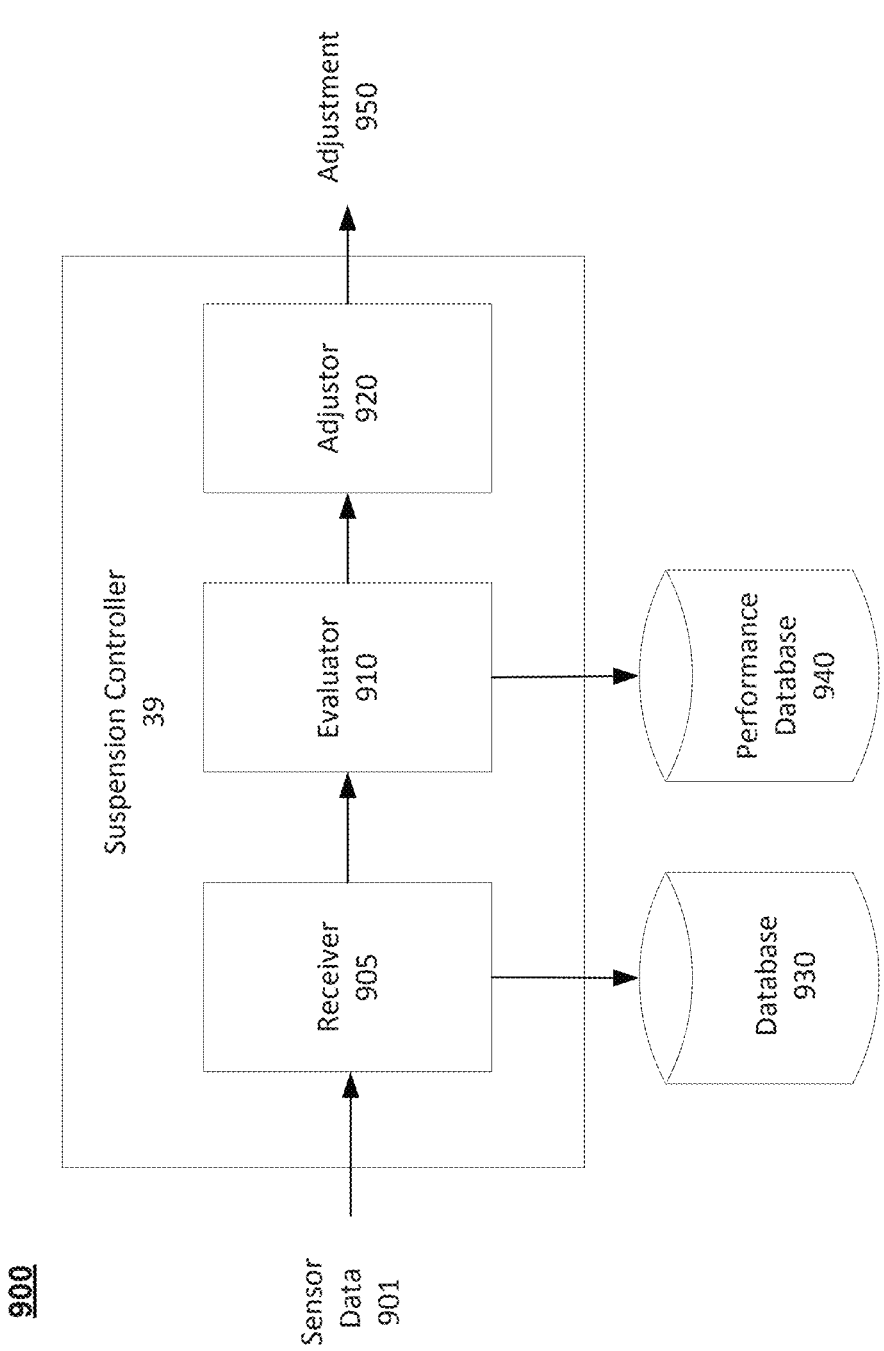
FIG. 9 is a block diagram of a suspension controller system, in accordance with an embodiment.

Referring now to FIG. 9, a block diagram of a suspension controller system 900 is shown in accordance with an embodiment. In one embodiment, suspension controller system 900 includes a suspension control device (e.g., suspension controller 39) and at least one active valve damper 38 and one or more sensors coupled with a vehicle as shown in FIGS. 1A and 1B. In one embodiment, suspension controller 39 includes a sensor data receiver 905, a sensor data evaluator 910, and an active valve damper adjustor 920.

In one embodiment, sensor data receiver 905 receives sensor data 901 from the one or more sensors (shown and described in FIGS. 1A-1B). In one embodiment, sensor data receiver 905 utilizes database 930 (or other memory solution) to collect and store the received sensor data 901.

In one embodiment, sensor data 901 includes sensor data such as accelerometer data, measurement data, and the like. In one embodiment, sensor data 901 is received from a bump sensor attached to one or both of the front and rear wheels that senses the bumps encountered by bicycle 50 (e.g., reading the terrain).

In one embodiment, sensor data 901 is received from a measurement type sensor (such as measurement type sensor 41) that continuously and/or repeatedly measures a distance from the bicycle fork steerer tube, crown, or other fixed point to the lower stanchion, wheel, fender, ground or other fixed point. By monitoring the distance between these points, the measurement type sensor can determine the suspension travel used and the speed at which the bicycle fork suspension compressed and rebounded.

In one embodiment, sensor data 901 is received from a measurement type sensor (such as sensor 40) that continuously and/or repeatedly measures a distance from the from the bottom shock eyelet, supporting shock substructure, or other fixed point to the top shock eyelet, supporting substructure, or other fixed point. By monitoring the distance between these points, the measurement type sensor can determine the shock suspension travel used and the speed at which the shock suspension compressed and rebounded.

In one embodiment, sensor data 901 is received from a plurality of sensor types as described herein.

In one embodiment, sensor data evaluator 910 determines a value of a repeating pattern identified in the sensor data, obtains a range of operational values for at least one damping characteristic of the active valve damper related to the repeating pattern, and adjusts the range of operational values based on the repeating pattern value. In one embodiment, the tunes including the operational values for at least one damping characteristic of the active valve damper are stored in performance database 940.

In one embodiment, active valve damper adjustor 920 is configured to monitor and adjust at least one damping characteristic of the at least one active valve damper (e.g., active valve damper 38). That is, active valve damper adjustor 920 will provide adjustment 950 commands to at least one active valve damper (e.g., active valve damper 38).

Figure 10:
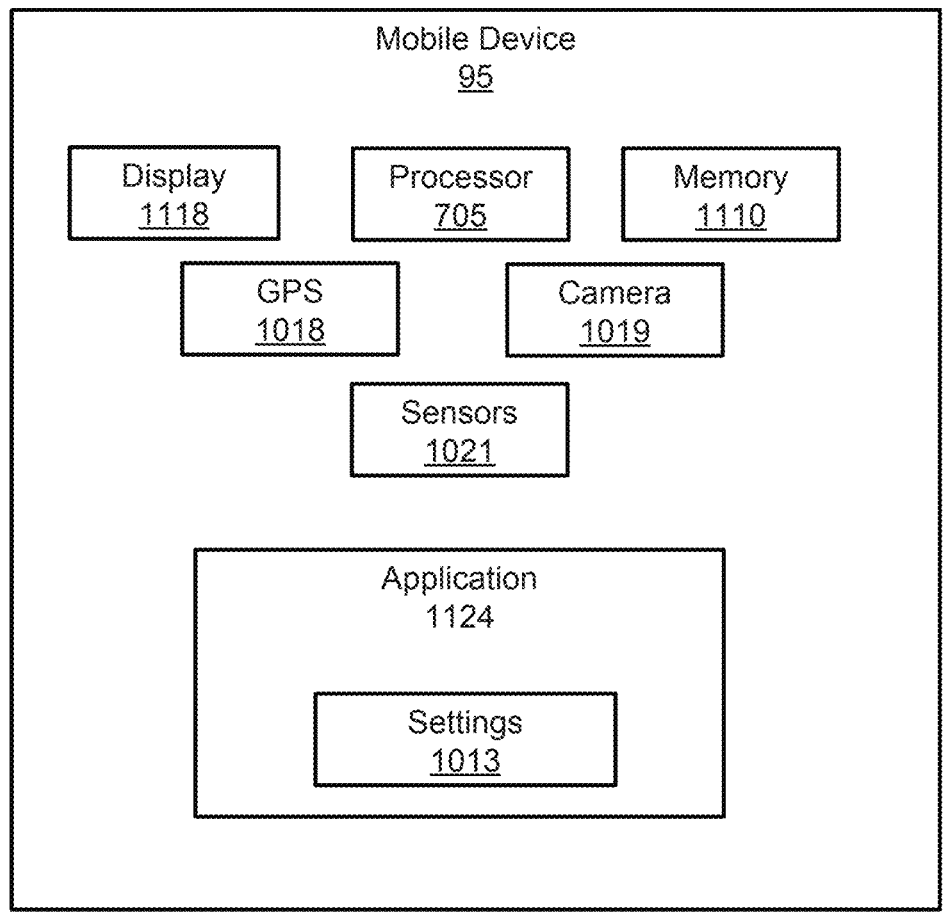
FIG. 10 is a block diagram of a mobile device, in accordance with an embodiment.

Referring now to FIG. 10, a block diagram of a mobile device 95 is shown. Although a number of components are shown as part of mobile device 95, it should be appreciated that other, different, more, or fewer components may be found on mobile device 95.

In general, mobile device 95 is an example of a smart device that is available for a user. Mobile device 95 could be a mobile phone, a smart phone, a tablet, a smart watch, a piece of smart jewelry, smart glasses, or other user portable devices having wireless connectivity. For example, mobile device 95 would be capable of broadcasting and receiving via at least one network, such as, but not limited to, WiFi, Cellular, Bluetooth, NFC, and the like. In one embodiment, mobile device 95 includes a display 1118, a processor 705, a memory 1110, a GPS 1018, a camera 1019, and the like. In one embodiment, location information can be provided by GPS 1018. In one embodiment, the location information could be enhanced by the broadcast range of an identified beacon, a WiFi hotspot, overlapped area covered by a plurality of mobile telephone signal providers, or the like. In one embodiment, instead of using GPS information, the location of mobile device 95 may be determined within a given radius, such as the broadcast range of an identified beacon, a WiFi hotspot, overlapped area covered by a plurality of mobile telephone signal providers, or the like. In one embodiment, geofences are used to define a given area and an alert or other indication is made when the mobile device 95 enters into or departs from a geofence.

Mobile device 95 includes sensors 1021 which can include one or more of audio, visual, motion, acceleration, altitude, GPS, and the like. Mobile device 95 also includes a mobile device application 1124 which is an electronic application that operates on mobile device 95. Mobile device application 1124 includes settings 1013. Although settings 1013 are shown as part of mobile device application 1124, it should be appreciated that settings 1013 could be located in a different application operating on mobile device 95, at a remote storage system separate from mobile device 95, or the like.

Figure 11:
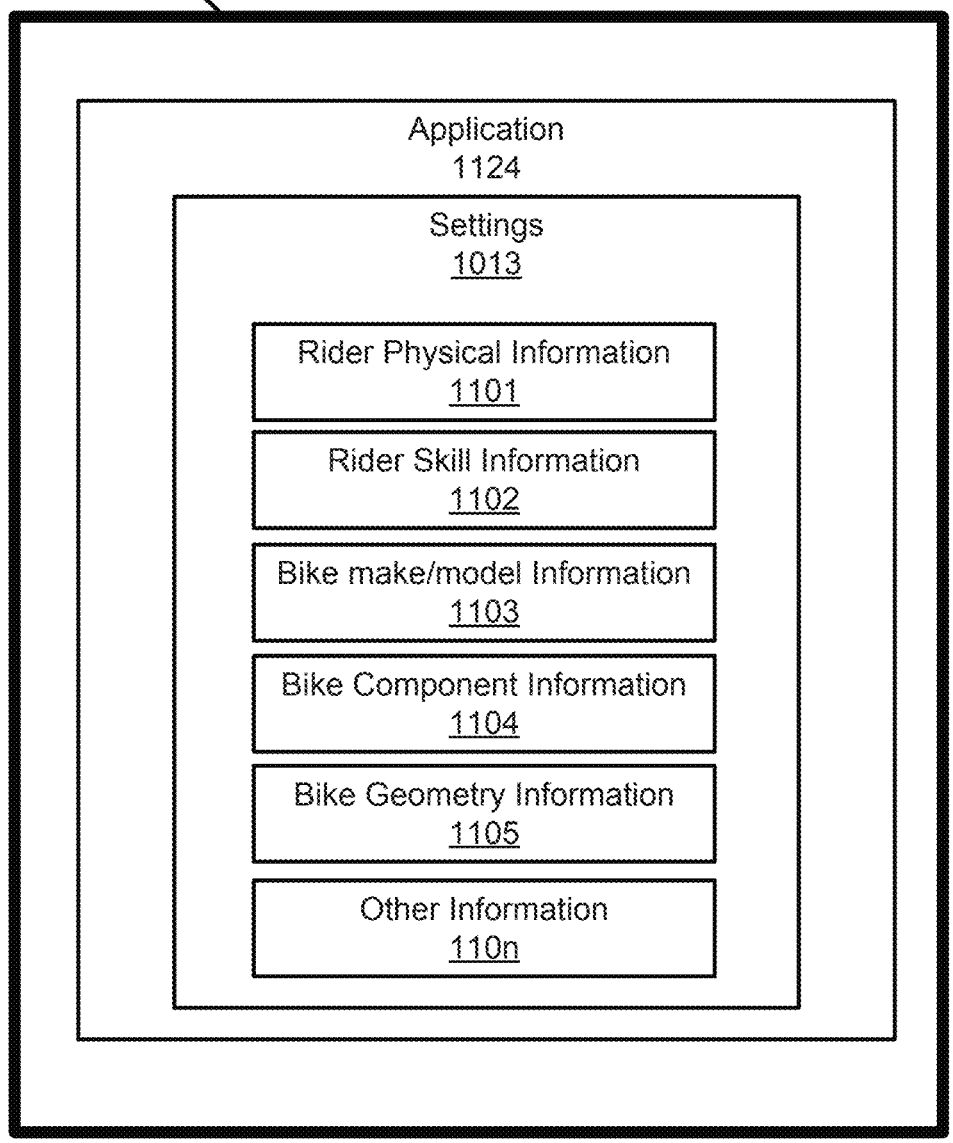
FIG. 11 is a block diagram of a mobile device display having a number of inputs shown for the application, in accordance with an embodiment.

Referring now to FIG. 11, a block diagram of a mobile device 95 display having a number of inputs are shown for the mobile device application 1124 in accordance with an embodiment. In general, the mobile device application 1124 operates on mobile device 95 and uses the communication capabilities of mobile device 95 to communicate with one or more active valves in the active valve system of the vehicle. The communication could be Bluetooth, near field communication (NFC), WiFi, or any other available wireless communication. In one embodiment, the communication could be wired if the mobile device 95 is mounted on the handlebar assembly 36 and a communications cable is running from one or more of the active valve systems to the handlebars and plugged into mobile device 95.

In one embodiment, the mobile device application 1124 receives input information to help establish the settings for the provided tunes. In one embodiment, the input information includes, a rider physical information 1101 which could include one or a combination of features such as rider height, weight, gender, age, body mass, body type, fitness level, heart rate, and the like. Rider skill information 1102, e.g., beginner, intermediate, advanced, professional, etc., or rider motivation (e.g., fun ride, race, workout, etc.), and the like. Bike make model information 1103, such as, bike manufacturer, bike model, bike use type (e.g., road, gravel, mountain, BMX, etc.), bike component information 1104 such as, one or more components on the bike (full suspension, half suspension, gearing, weight, tires, wheels, manufacturer of components, etc.), and the like.

Moreover, the input information to the mobile device application 1124 includes bike geometry information 1105 such as: seat height setting, seat pitch, seat offset, crank arm length, wheel diameter, handlebar width, handlebar offset (fore or aft), pedal type, and the like. Further, there could be one or more other information 110$n$ categories that could be added to the inputs. In one embodiment, the inputs could be more or fewer of the above categories, could be different categories, could be user selectable, application driven, and the like. The use of the described categories herein is provided as one embodiment.

In one embodiment, some or all of the above information could be obtained by user input, by communication between the user's mobile device 95 and a networked device such as a scale, smart watch or other smart jewelry that monitors one or more user's biometrics (e.g., heart rate, body mass, temperature, etc.), one or more sensors on the vehicle, or the like. In one embodiment, the information could be obtained by an image capture device (such as a camera) that obtains an image of the bike, a bike component, a 1D or 2D code on the bike or bike component, and the like. In one embodiment, the captured image(s) are then evaluated by the mobile device application 1124 (or other recognition capability) to make one or more bike specific measurement determinations therefrom, make one or more bike part specific component brand/model/year determination(s), make one or more bike brand/model/year determination(s), make one or more bike geometric determination(s) (e.g., seat height-from ground, seat height-from cranks, etc.; wheel diameter, type/brand/wear of tires, and the like).

In one embodiment, mobile device application 1124 allows the user to search, select, and upload one or more factory and/or customer active valve suspension tunes.

In one embodiment, mobile device application 1124 can provide the rider with the tunes that correlate with one or more of the rider inputs provided to settings 1013. For example, there may be 5,000 tunes stored in the factory database. In one embodiment, instead of the user manually selecting from the 5,000 tunes, mobile device application 1124 will use the user inputs to automatically narrow the number of tunes down to only those that meet the user input criteria. For example, novice tunes, expert tunes, bike model/brand tunes, damping assembly types, and the like.

In one embodiment, mobile device application 1124 will also manage a number of bike profiles. For example, the user may have three different vehicles (a mountain bike, a road bike, and a quad). There may be different tunes downloaded to mobile device application 1124 for each of the three (or any number) of different vehicles. The user can select which vehicle she will be riding (e.g., the mountain bike), and the available tunes for the mountain bike will be presented by the mobile device application 1124 as shown and described in further detail in FIG. 12.

In one embodiment, mobile device application 1124 can also perform system diagnostics on the vehicle active valve system, can calibrate the vehicle active valve system, can provide firmware updates to one or more components of the vehicle active valve system, and the like.

In one embodiment, mobile device application 1124 on mobile device 95 can communicate directly with the active valve system and then provide the information to the rider via the mobile device display. In one embodiment, mobile device application 1124 can communicate with another device that provides the power to the active valve system (e.g., a Bosch Kiox HMI, or the like). In one embodiment, the device that provides power to the active valve system will also have a front mounted display that can present information from mobile device application 1124 to the rider. In one embodiment, the rider can change to a different active valve suspension tune (while stopped, on-the-fly, or the like) via the mobile device application 1124 and/or by the Bosch handlebar button and Kiox screen. In one embodiment, the active valve suspension tune selected on the Kiox is reflected on the mobile device application 1124 and similarly, an active valve suspension tune selected in the mobile device application 1124 is reflected on the Kiox screen.

Figure 13:
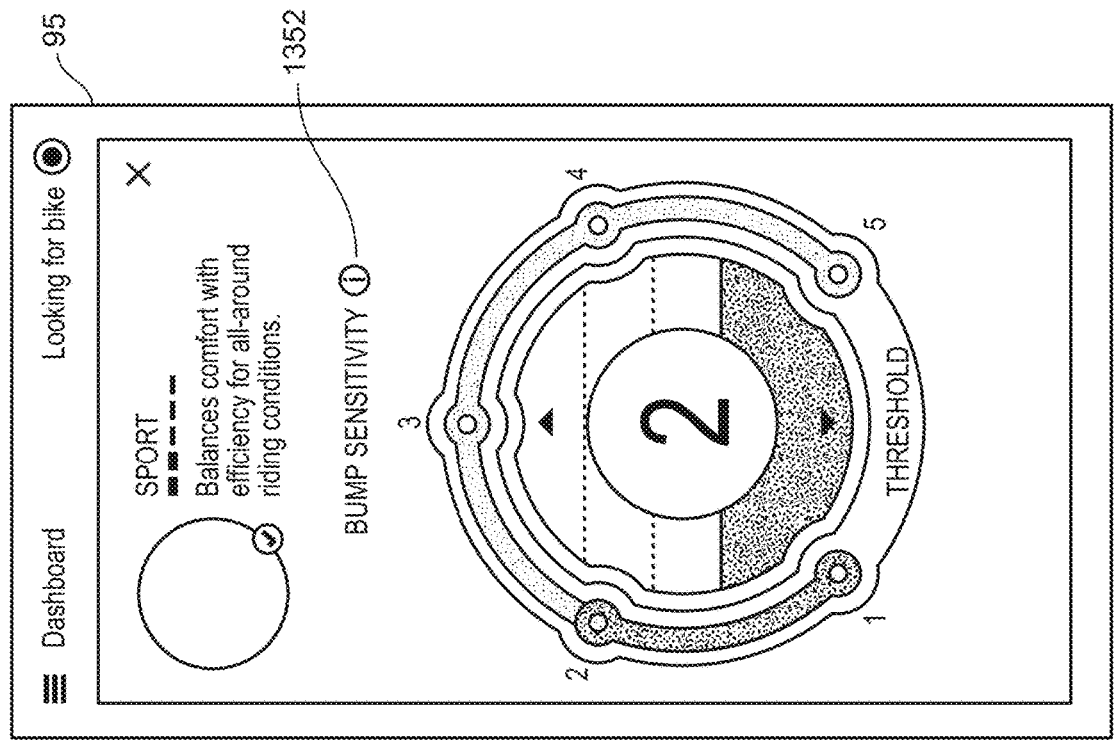
FIG. 13 is a screenshot of a user adjustable capability that is accessed when the user wants to change a tune in the application, in accordance with an embodiment
Figure 12:
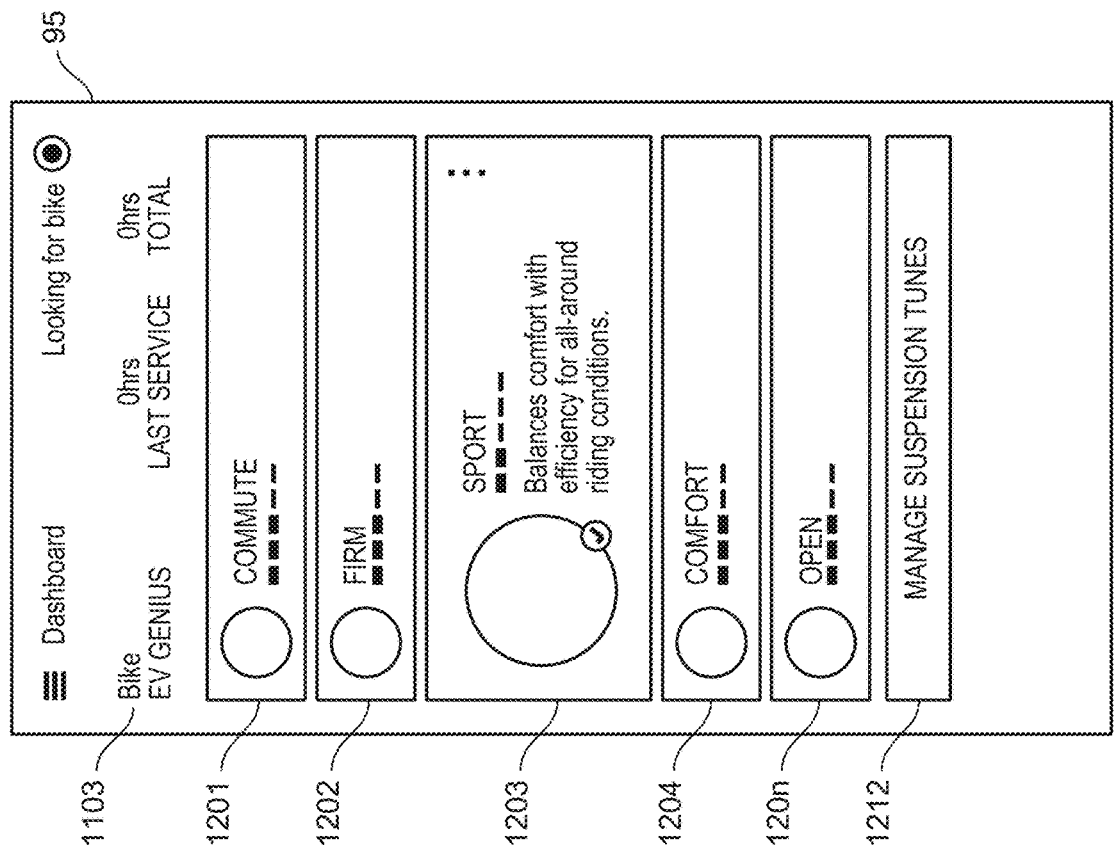
FIG. 12 is a screenshot of the application having a number of different tunes shown on a display, in accordance with an embodiment.

With reference now to FIGS. 12, a screenshot of the mobile device application 1124 having a number of different tunes 1201-1204 is shown in accordance with an embodiment. FIG. 13 is a screenshot of a user adjustable capability that is accessed when the user wants to change a tune in accordance with an embodiment.

In FIG. 12, mobile device 95 displays the mobile device application 1124 that includes the bike identifier information 1103 and five different tunes 1201-120n. In one embodiment, the tunes include a commute tune 1201, a firm tune 1202, a sport tune 1203, a comfort tune 1204 and an open tune 1205. Although five tunes are shown, it should be appreciated that there may be more or fewer tunes. The use of five tunes herein is one embodiment and provided for purposes of clarity. Further, although four of the five tunes have specific names, it should be appreciated that in another embodiment, there may be all custom tunes, a number of differently modified sport tunes, or the like. For example, a rider may make a first comfort tune for road riding, a second comfort tune for trail riding, a third comfort tune for the racetrack, etc. Thus, the naming and or type of tunes is multi-faceted, and user or application driven.

Gg

In one embodiment, switch 93 is used in conjunction with the active valve suspension and the active valve mobile device application 1124. In one embodiment, switch 93 is a multi-positional switch, an upshift/downshift type of switch, or the like. For example, switch 93 would be a 2-position switch, a 3-position switch, a switch that can cycle up and down through a number of different modes (similar to a gear shift), or the like.

In one embodiment, the rider can use switch 93 to select between different tunes on the fly. For example, in a 3-position switch configuration, the rider will use switch 93 to cycle between 3 tunes (such as for example, a sprint/off/auto) for the active suspension-on the fly while riding. In one embodiment, sprint would be full-time firm and might be used when sprinting for a finish line in a race, off would be passive, and auto would be active valve algorithm operating normally. For example, the rider will change the position of switch 93 which will cause the tune to change.

In one embodiment, switch 93 is used to cycle through any number of different tunes using a switch selection capability that acts similar to a gear shift configuration, e.g., the rider can change the selected tune based on the number of upshifts, downshifts, button pushes, left/right movements, or the like. For example, moving (or other components of the active valve system) from center to the right, releasing, moving it to the right again, etc., would allow the rider to cycle upward from tune 1 through tune 6 (or tune n). Similarly moving the switch from center to the left, releasing, moving to the left again, would allow the rider to cycle through back down through the tunes in the opposite direction. In one embodiment, the rider would stop at any of the 6 tunes by cycling the switch to the different left/right positions, etc.

In one embodiment, switch 93 is a button type switch such that each time switch 93 is depressed it cycles to the next location in a predefined number of locations. For example, if there are 8 storage locations within switch 93, then each time the button is pushed, it will switch to a different storage location. In one embodiment, the button pushing results in a linear movement through the different storage locations, e.g., 1, 2, 3 . . . 7, 8, 1, 2 etc. In one embodiment, a different tune is stored in each different storage location.

In one embodiment, the tunes available in the different storage locations of switch 93 are programmable by the rider using application 1124. In one embodiment, the tunes available in the different storage locations are modifiable at any time using the application 1124. In one embodiment, the tunes available in the different storage locations are selectable on-the-fly, etc. In one embodiment, any or all of the tunes are assigned by the rider (or by the app) to any of the different number of shift locations. For example, if the rider had 4 riding tunes, switch 93 is used to cycle through the 4 different tunes.

In another embodiment, for example, if the rider has 12 available tunes, switch 93 would be able to cycle through all 12 different tunes, through a limited number of the tunes, or the like. For example, if the switch 93 only had 5 different storage locations, there would only be 5 tunes (of the 12) available to be assigned to the 5 different storage locations.

In one embodiment, all of switch 93 storage locations would be filled with tunes. In another embodiment, only some of switch 93 storage locations are filled. In one embodiment, if only some of switch 93 storage locations are filled, then switch 93 would only cycle through the filled storage locations. For example, if switch 93 had 100 storage locations, and only two of the storage locations were filled with tunes, then when cycled through, switch 93 would only go to the filled storage locations (in this example location 1 or location 2). Thus, when the rider wanted to switch between the two loaded tunes, each storage location change selected by the rider (e.g., a push, right click, left click, etc.) would only move between storage location 1 and storage location 2. The rider would not need to cycle through the empty storage locations.

In another example, if switch 93 had 100 storage locations and all 100 storage locations of switch 100 are filled, then each switch 93 selection would cause switch 93 to move to the next storage location as switch 93 would cycle through all of the filled storage locations.

In another embodiment, if switch 93 had 100 storage locations and all 100 storage locations of switch 100 are filled, the rider (and or application 1124), could designate and a certain number of the storage locations to be cycled through by activation of switch 93. For example, storage locations 1-15 are designated as low altitude (e.g., sea level to 3000 ft) road configuration tunes, storage locations 16-30 are designated as low altitude trail/gravel/fire road configuration tunes, storage locations 31-45 are designated as low altitude downhill off-road racing configuration tunes, storage locations 46-60 are designated as high altitude (e.g., 3000+ft) road configuration tunes, storage locations, storage locations 61-75 are designated as high altitude trail/gravel/fire road configuration tunes, storage locations 76-90 are designated as high altitude downhill off-road racing configuration tunes, and storage locations 91-100 are designated as dirt track configuration tunes.

Before the ride starts, the rider could designate a subset of the different storage locations of switch 93 to be active for the given ride. For example, if the rider is going on a fire road ride when the ride was below 3000 ft (which could be manually selected, or automatically determined by one or more sensors), switch 93 would be set to only use the tunes in filled storage locations 16-30. Thus, when the rider wanted to switch to a different tune, each storage location change selected by the rider (e.g., a push, right click, left click, etc.) would only cycle between storage locations 16 through 30. The rider would not need to cycle through the irrelevant tunes.

If the altitude changed to more than 3000 ft during the ride, then the designated subset of different storage locations would manually (or automatically) change to storage locations 61-75.

Using the same example, if the rider was going on a fire road ride below 3000 ft (which could be manually selected, or automatically determined by one or more sensors), switch 93 would be set to only use the tunes in filled storage locations 16-30. However, within the storage locations 16-30, there could be additional subsets of tunes. For example, storage locations 16-20 are training tunes, storage locations 21-25 are softer tunes, and storage locations 26-30 are racing tunes. The range of switch 93 is further adjusted to only cycle through the relevant tunes. E.g., the rider is on a training ride on a fire road below 3000 ft. As such, when the rider wanted to switch to a different tune, only storage locations 16-20 would be available. Therefore, each storage location change selected by the rider (e.g., a push, right click, left click, etc.) would only cycle between storage locations 16 through 20. The rider would not need to cycle through the irrelevant tunes.

In one embodiment, the assignment of tunes to the storage location (e.g., memory) of suspension controller 39 is done via a wired or wireless communication between suspension controller 39 and mobile device 95 (and more specifically, app 1124 operating on mobile device 95). In one embodiment, the assignment of tunes to the storage location (e.g., memory) of switch 93 is done via a wired or wireless communication between switch 93 and mobile device 95 (and more specifically, app 1124 operating on mobile device 95).

For example, in a wireless communication method, switch 93 (or suspension controller 39) would communicate with the mobile device 95 (or other components of the active valve system such as suspension controller 39) via Bluetooth, NFC, WiFi, a hotspot, a cellular network, or the like. In one embodiment, app 1124 would recognize switch 93 (or suspension controller 39), determine the number of storage locations of switch 93 (or suspension controller 39), and then download the (automatic and/or user designated) tunes to the different storage locations.

In contrast, if switch 93 did not have wireless communication capabilities it could be communicatively coupled to mobile device 95 and/or suspension controller 39 (or other active components) by way of an input port (such as USB, micro USB, or any other connectable wired configuration). In one embodiment, if switch 93 is coupled with mobile device 95, app 1124 would recognize switch 93, determine the number of storage locations of switch 93 and then download the (automatic and/or user designated) tunes to the different storage locations. Switch 93 would then be disconnected from the mobile device 95, mounted on the vehicle and then plugged into the active valve adjustment system. As such, the rider could still switch between the tunes using switch 93, but the rider would not be able to wirelessly modify the tunes stored in switch 93.

In one embodiment, if suspension controller 39 is coupled with mobile device 95, app 1124 would recognize suspension controller 39, determine the number of storage locations of suspension controller 39 and then download the (automatic and/or user designated) tunes to the different storage locations. Suspension controller 39 would then be disconnected from the mobile device 95. As such, the rider could still switch between the tunes using switch 93 in conjunction with suspension controller 39, but the rider would not be able to wirelessly modify the tunes stored in suspension controller 39.

In one embodiment, switch 93 could have both wired and wireless communication capabilities with one or both of mobile device 95 and suspension controller 39.

In one embodiment, the tunes available to switch 93 are designated (or sorted, ranked, located, assigned, or the like) by the rider. In one embodiment, the tunes available to switch 93 are designated (or sorted, ranked, located, assigned, or the like) automatically by the application. In one embodiment, the tunes available to switch 93 are designated by a combination of automation and rider input. For example, the tunes available to switch 93 could be initially automatically assigned by application 1124 and then the rider could manually add, move, modify, replace, remove, re-order, or otherwise edit the initial automatic assignment thereof.

For example, in one embodiment, switch 93 will include a plurality of modes, each mode of the plurality of modes tied to a position of the manually operated switch, and a database to link each of the plurality of modes with a different one of the plurality of suspension tunes stored in the memory. In one embodiment, the database is a user assignable database configured to receive user input to link each of the plurality of modes with the different one of the plurality of suspension tunes stored in the memory.

In one embodiment, the database is an automatically assigned database configured to automatically link each of the plurality of modes with the different one of the plurality of suspension tunes stored in the memory. In one embodiment, the automatically assigned database uses location information input from a positioning system, the location information input a metric used in a selection of which of the plurality of different suspension tunes to automatically link with the plurality of modes.

In one embodiment, the automatic assignment is based on any or all of the different automated selection methods discussed herein, such as, but not limited to, on the rider's location, rider's previous mode tune choices on the same or similar rides, tunes selected by a trainer, tunes used on the same (or similar) ride by a peer, the altitude of the ride, the geography of the ride, the type of the ride (e.g., sprint, hill climb, hill decent, long ride, etc.), the terrain of the ride, the type of bike, one or more features on the bike, etc.

In one embodiment, the tunes are different based on the inputs provided at FIG. 12 information such as rider skill level, bike type, one or more components on the bike, rider motivation, and the like. For example, a new rider would receive one or more tunes that were set at a first level, while an expert rider (or intermediate rider) would receive one or more tunes that were set at a second level. This differentiation in tune settings can also occur between bike types, e.g., a road bike would likely (but may not necessarily) receive different automatic (or initial tune) settings that that of a gravel bike, mountain bike, etc.

When the user selects an active valve suspension tune, e.g., sport tune 1203 the tune would include a number of different suspension settings. For example, as shown in FIG. 13, sport tune 1203 has an initial bump sensitivity 1352 setting of 2 from a scale of 1 to 5. If the user wanted to, they could adjust the initial bump sensitivity 1352 to a new bump sensitivity (e.g., sensitivity level 3) which would either be a firmer setting or a softer setting depending upon which way the sensitivity scale was ranked. Other active valve suspension tune management bump sensitivity 1352 features include timers, coupling/decoupling front and/or rear dampers, incline angles, and the like.

Figure 14:
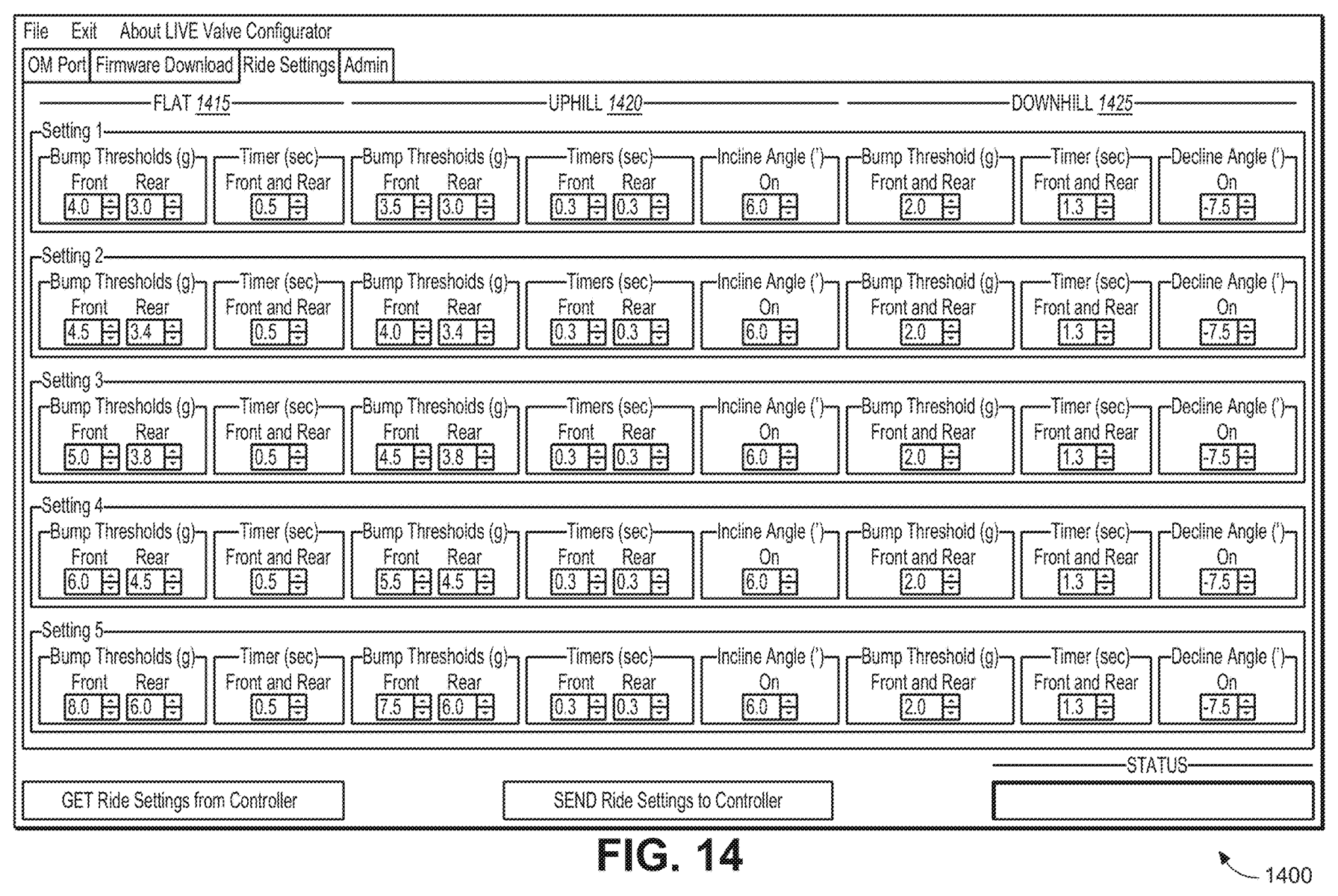

In one embodiment, as shown in FIG. 14, a screenshot of a ride settings management page, the management of active valve suspension tunes 1212 includes managing metrics such as flat, uphill, and downhill bump settings.

In one embodiment, when mobile device application 1124 is opened, it will attempt to connect to suspension controller 39. In one embodiment, the settings are loaded into mobile device application 1124 either from a file at a database or from the suspension controller 39.

An "active valve suspension tune" is used herein to encapsulate a group of settings that have been optimized for a particular feel or set of riding conditions. The best way to understand all of the settings in a tune is to look at one level at a time. Within a level, there are three sets of two threshold values for both the front and rear shock. Which of these sets is active depends on what "pitch mode" the bike is in. If the bike is in uphill mode 1420 (e.g., climbing), the uphill thresholds are used. If the bike is in downhill mode 1425 (descending), the downhill thresholds are used. By comparing the sets of thresholds in one level to another, it will be noted that, as the level increases, the thresholds increase. In one embodiment, the level units are g-forces.

In one embodiment, when the user increases the bump sensitivity in the live valve smartphone app 1124 (as shown in FIGS. 12-13), under the hood the app 1124 moves some or all of the thresholds in the next level.

In one embodiment, the thresholds include front suspension settings and rear suspension settings. In one embodiment, the thresholds could include more or fewer suspension aspects such as a seatpost suspension setting, two different front/rear settings for a vehicle with two rear suspensions, two front suspensions, four wheeled suspension, etc.

There are also different types of use cases (or pitch metrics) that can be used. One embodiment, shows three pitch active valve suspension tunes, e.g., flat, climb, and descend, however, it should be appreciated that there could be additional active valve suspension tunes such as freefall (or jump active valve suspension tunes), etc. In one embodiment, each of the use cases can have their own thresholds or could share thresholds. In one embodiment, a "0" threshold setting can indicate an always open case, while a "99" threshold setting can indicate an always closed case.

In one embodiment, a configuration file is used to store all configurable settings associated with the operation of a live controller. It is a text file formatted as a YAML (a recursive acronym for "YAML Ain't Markup Language") file. These settings files are used by various programs to (1) program or "flash" settings to the controller's flash memory or (2) read out and save controller settings to a file.

There are many sections in a configuration file, but for the mobile device application 1124, the only section that is viewed and edited (unless the user has administrator access to the admin page), is the tune data. In one embodiment, control style tune metrics define how the suspension performs in various conditions. Metrics include coupled and decoupled, e.g., decoupled: the front and rear shocks behave independently-a bump detected by the front sensor has no effect on the rear shock; coupled: the front and rear shocks act together: when the either the front or rear sensor detects a bump, the controller will open both the front and rear shocks; the tune can also include interrelated metrics. In other words, tune metrics that are determined or modified by other tune metrics. For example, in one embodiment of a pitch-determined interrelated style, the front and rear are coupled as above when the bike is level ("flat") or descending, however, when the bike is on an incline ("climb"), the front and rear are decoupled as described above; and the like.

In other words, a tune's settings could be global for all components, or setting that are only defined for two or more of the plurality of suspension components, for suspension components in a defined grouping, etc. In one embodiment, the defined grouping could be front suspension components, rear suspension components, front and seatpost (or seat) suspension components, rear and seatpost (or seat) suspension components, handlebar and seat suspension components, or any combination thereof.

In one embodiment, the angles are incline on angle: this is the angle, adjustable from 3° to 9.9°, at which the controller enters "incline" (climb) mode. In other words, incline on angle refers to the angle that indicates when the tune should shift to the climb thresholds. This angle could be monitored by a sensor that includes an inclinometer or the like. For example, a training tune could have an include on angle of 9 degrees while a race tune could have an incline on angle of 6 degrees. Thus, in a training ride example, in one embodiment, when the inclinometer is reading less than 9 degrees the "flat" thresholds would be used, when the inclinometer is reading 9 degrees or greater, the "climb" thresholds would be used.

Similarly, the tune could include a decline on angle: this is the angle, adjustable from −3° to −9.9°, at which the controller enters "decline" (descend) mode. In other words, decline on angle refers to the angle that indicates when the system should shift to the descend thresholds. Here again, this angle could be monitored by a sensor that includes an inclinometer or the like. For example, a training tune could have a decline on angle of −8 degrees while a race tune could have a decline on angle of −4 degrees. Thus, using the training ride example above, in one embodiment, when the inclinometer is reading more than −8 degrees but less than 9 degrees, the "flat" thresholds would be used, when the inclinometer is reading −8 degrees or less, the "descend" thresholds would be used and when the inclinometer is reading 9 degrees or greater, the "climb" thresholds would be used.

In one embodiment, suspension controller 39 could include a number of tune memory locations available to store the active valve suspension tunes. The tune memory locations could include a number of factory memory locations, user memory locations, etc. In one embodiment, the memory locations could be initially filled with a mix of tunes such as a factory tune in memory location 1, and a user modification of the factory tune in memory location 2.

As such, during a ride, the user could initially select the tune found in tune memory location 2. If the tune is not working properly or is not providing the desired results, the rider can then select tune memory location 1 using switch 93, or the app 1124 operating on their mobile device 95, to switch to the factory tune A settings. In one embodiment, this change to factory tune A will occur in real-time and allow the rider to continue or complete the ride using the factory tune A settings.

Similarly, if the user had filled memory location 3 with another modified version of factory tune A, filled memory location 4 with a differently modified version of factory tune A, filled memory location 5 with yet another modified version of factory tune A, the rider could evaluate the different settings of each tune by switching therethrough. Thus, the rider could use the different tunes to evaluate different changes to a single setting, to a number of settings, etc.

For example, the factory tune could have an Incline on angle of 6, while a first modified version adjusted the Incline on angle to 5, another modified version adjusted the Incline on angle to 4, yet another modified version adjusted the Incline on angle to 3, etc. Thus, the user could evaluate the ride performance across the same tune with the only variation being the Incline-on angle. From this evaluation, the user (or team, factory, aftermarket component provider, etc.) could determine their own personal best performance Incline on angle.

In one embodiment, this tuning approach could be used again for any number of the different settings for a given tune. In so doing, this capability would allow a user (team, factory, aftermarket component provider, etc.) to develop a specific tune that was based on a given factory tune, but which included a number of modified values that worked best for the user and bike configuration.

The following is an example of the code for an exemplary active valve suspension tune: In this case, a sport tune.
```
slot:
   base_slot: 2
   id: 3
   name: [S, P, O, R, T, "\0", "\0", "\0", "\0", "\0", "\0",
      "\0", "\0", "\0", "\0", "\0", "0", "\0", "\0", "\0", "\0",
      "\0", "\0", "\0", "\0", "\0", "\0", "\0", "\0", "\0",
      "\0"]
   threshold_index: 2
   timestamp: [0, 1]
threshold:
   bump_threshold:
      −[3000, 3500, 4000, 5000, 6000]
      −[2000, 2000, 2000, 2000, 2000]
      −[2500, 3000, 3500, 4500, 5500]
      −[2250, 2625, 3000, 3750, 4500]
      −[2000, 2000, 2000, 2000, 2000]
      −[2000, 2300, 2625, 3375, 4125]
slot_3_settings:
   mode:
      coupled_open_time:
         −[300, 300, 300, 300, 300]
         −[1300, 1300, 1300, 1300, 1300]
         −[0, 0, 0, 0, 0]
         decline_angle: [−600, −600, −600, −600, −600]
         decline_delay: [0, 0, 0, 0, 0]
         decline_hysteresis: [−300, −300, −300, −300, −300]
      decoupled_open_time:
         −[500, 500, 500, 500, 500]
         −[500, 500, 500, 500, 500]
         −[500, 500, 500, 500, 500]
         −[300, 300, 300, 300, 300]
         −[300, 300, 300, 300, 300]
         −[300, 300, 300, 300, 300]
      incline_angle: [600, 600, 600, 600, 600]
      incline_delay: [250, 250, 250, 250, 250]
      incline_hysteresis: [550, 550, 550, 550, 550]
      shock_control_style: 4
```
The active valve suspension tune has a name (sport tune), a threshold index (0-5), a front bump threshold matrix: where the three rows are defined as climb (incline), flat (neutral), descend (decline) and the columns are related to the threshold index selection, and a rear bump threshold matrix: where the three rows are defined as climb (uphill mode 1420), neutral (flat mode 1415), descend (downhill mode 1425) and the columns are related to the threshold index selection.

In one embodiment, the settings are made automatically. In one embodiment, the settings could be selected or modified by the user, modified by the input provided by the user, or the like. In one embodiment, the settings could be a combination of automatic settings, user selected settings, and user input information which are used in combination to develop the underlying active valve suspension tune.

In one embodiment, in addition to receiving the sensor data supplied by any mounted sensors from the sensors, or from the suspension controller 39, in one embodiment the user's mobile device 95 (or one or more smart device(s) in communication with the user's mobile device) would also have one or more sensors for obtaining and supplying data such as inertia, pitch, roll, yaw, altitude, and the like. In one embodiment, some or all of the sensor information (from some or all of the pluralities of sensors) could be provided to the mobile device application 1124 to allow the mobile device application 1124 to automatically change some tune settings on the fly, provide a notice to the rider to manually change one or more tune settings, or some combination thereof.

Figure 15:
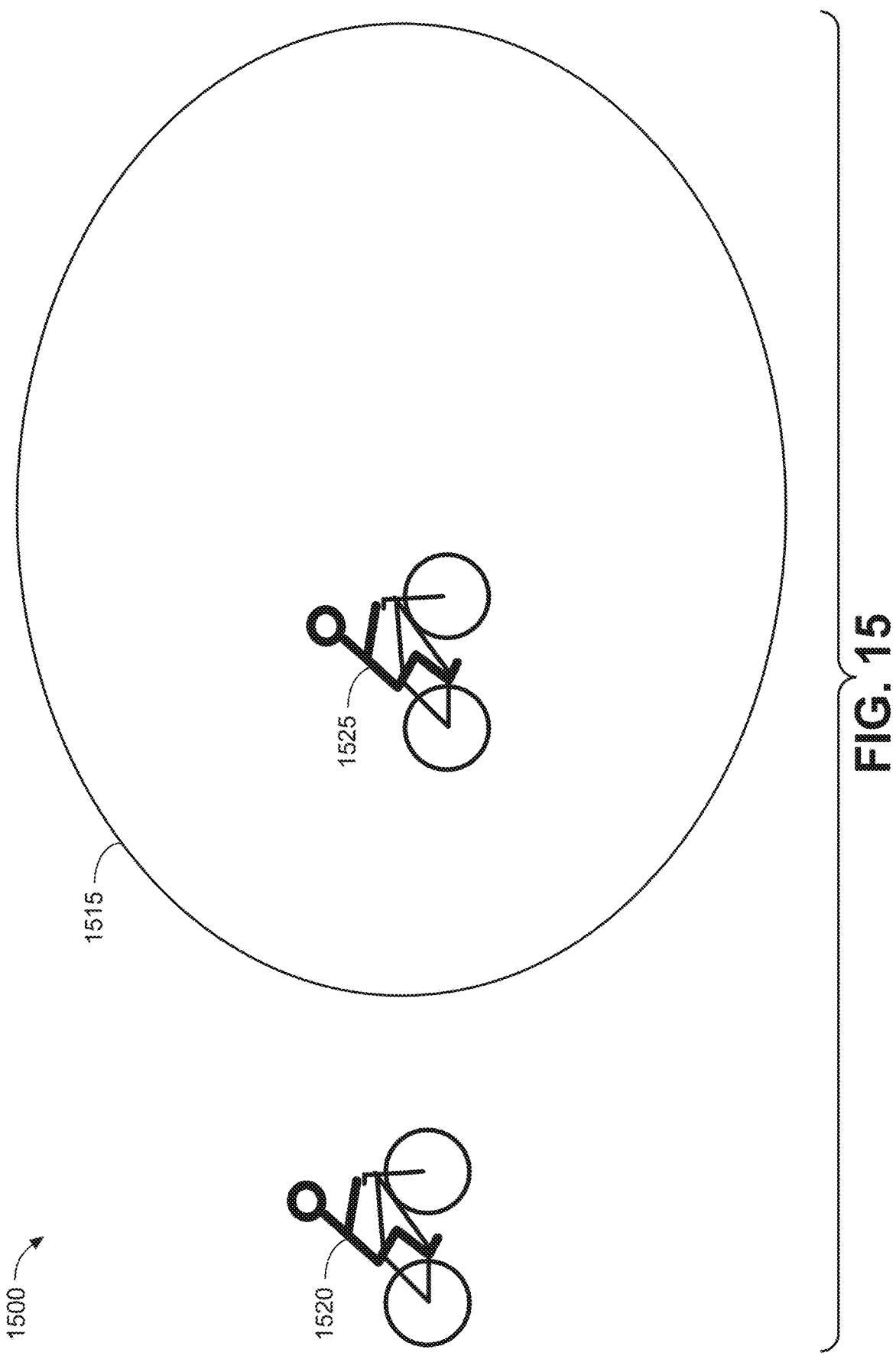
FIG. 15 is a high level view of a defined area, in accordance with an embodiment.

Referring now to FIG. 15, a high level view 1500 of a defined area is shown in accordance with an embodiment. For example, the user' mobile device 95 could also include location information from mobile device 95 that is pulled into the mobile device application 1124. The location information could be GPS location, WiFi location information, Cellular network location information, or any information that could be used by the mobile device 95 to obtain location information.

For example, in one embodiment, the mobile device application 1124 received input information includes location information that would define an area 1515 (such as a geofence, elevation level, terrain type, or the like). When the mobile device 95 enters into the area 1515 (as shown by bike 1525 inside area 1515 and bike 1520 outside of area 1515), the mobile device application 1124 would update some of the tune settings to match the tune settings for the given area. The update to the tune settings could be automatically performed or could be provided as an "advisory" to the rider to modify the settings to the geofence settings. In one embodiment, the location settings could further be adjusted by the in-mobile device application 1124 settings based on the previously described features that were input into the application as discussed with respect to FIGS. 12-14.

In addition, in one embodiment a new rider would receive a first set of automatic setting adjustments when they entered area 1515, while an expert rider (or intermediate rider) would receive a second set of automatic setting adjustments when the entered area 1515. This differentiation of settings could also occur between bike types, e.g., a road bike entering into area 1515 would likely (but may not necessarily) receive different automatic settings that that of a gravel bike, mountain bike, etc. Moreover, the entering into area 1515 could provide a multitude of possible automatic settings based on the rider information in the mobile device application 1124, information such as rider skill level, bike type, one or more components on the bike, rider motivation, and the like.

Referring again to FIG. 12, in addition to having automatic or predefined tunes 1201-1204, there can also be peer generated custom tunes 120n that will be provided, such as in a custom mode, to other application users for download and utilization.

For example, trail x is ridden by Johnny Pro and he records his settings (or tune) and uploads them for the mobile device application 1124 (Johnny does trail x). Another rider could then download Johnny Pro's settings (e.g., the tune Johnny does trail x) and use then use that specific tune to ride trail x (or to ride other trails).

Similarly, Franky Speed could ride his bike with specific components thereon, record his settings and upload them for the mobile device application 1124. Another user with a bike having the same (or similar) specific components thereon (or same bike model, brand, year, etc.) would be able to find the custom tune for her similar bike and download that custom Franky Speed configuration to her mobile device 95. Thus, there could be custom tunes for general locations, different altitudes, specific rides, specific riders, certain bikes, different bike brands, different bike models, bikes with similar components, and the like.

For example, the custom tunes can come from FOX or the OEM and might target a specific type of rider or a specific geographic location. In one embodiment, the custom tunes are downloaded into a "bullpen" and can then be dragged into the active stack of 5 (or any defined number) tunes. In one embodiment, when a new tune is selected from the bullpen, the replaced tune would then drop down into the bullpen, available for later use (e.g., "Johnny does trail x" replaces comfort 1204). In one embodiment, before dissemination, any custom tunes would be sent for approval, and then the approved custom tunes would be available for download.

Although, in one embodiment, the custom tunes are managed by the mobile device application 1124 or the servers supporting mobile device application 1124 (e.g., the management location from which tunes are uploaded to and downloaded from), in one embodiment, one or more peer generated custom tunes 120n could be shared peer-to-peer via Wifi, Bluetooth, NFC, etc. In one embodiment, they could be shared through a middleman such as a webstore, a social network, a riding club, or any combination thereof.

In one embodiment, there could also be a collection of performance data taken during the ride. The collected performance data could be used to compare the settings (or tune) used on the ride with the actual performance of the active valve and other reporting components. This comparison could be used to determine if the selected settings (or tune) was the most appropriate for the ride, if one or more aspects of the tune should be adjusted for performance gains, if the active valve system was operating correctly, if any faults were detected, or the like. For example, in the collected performance data it may be determined that the downhill setting did not allow for the full motion of one or more active components. The determination would further be that the downhill setting was too stiff and that a softer setting would have allowed for additional performance to be obtained from the one or more active components. In another embodiment, the determination would be that one or more of the active valves in the active valve system was not operating correctly and needed an update, replacement, or the like. In yet another embodiment, the determination would be that one or more of the components on the bike was not operating correctly and needed repair, replacement, or the like.

In one embodiment, if the determination was that the tune was not correct for the situation, the result of the comparison would be an adjustment to the downhill portion of the tune.

In one embodiment, if the same downhill adjustment was needed for the same rider on a number of different rides, there may be further input such as rider weight, height, seat settings, and the like that could be added to the inputs for the mobile device application 1124 and then used to adjust some portion of one or more of the settings (or tunes). Moreover, if the same downhill tune adjustments were determined for a number of riders (each of which being shorter than 5'7") that height information could be used to automatically modify the initial tune information once the height was provided by the rider to the application 124. Although height is discussed, the recurring feature could be, on or a combination of, rider height, weight, gender, age, body mass, body type, fitness level, heart rate, seat height setting, seat pitch, seat offset, crank arm length, wheel diameter, handlebar width, handlebar offset (fore or aft), pedal type, etc. Further, some or all of the above information could be obtained by user input, by communication between the user's mobile device 95 and networked devices such as a smart scale, smart watch or other smart jewelry that monitors one or more user's biometrics (e.g., heart rate, body mass, temperature, etc.); and the like.

Figure 16A:
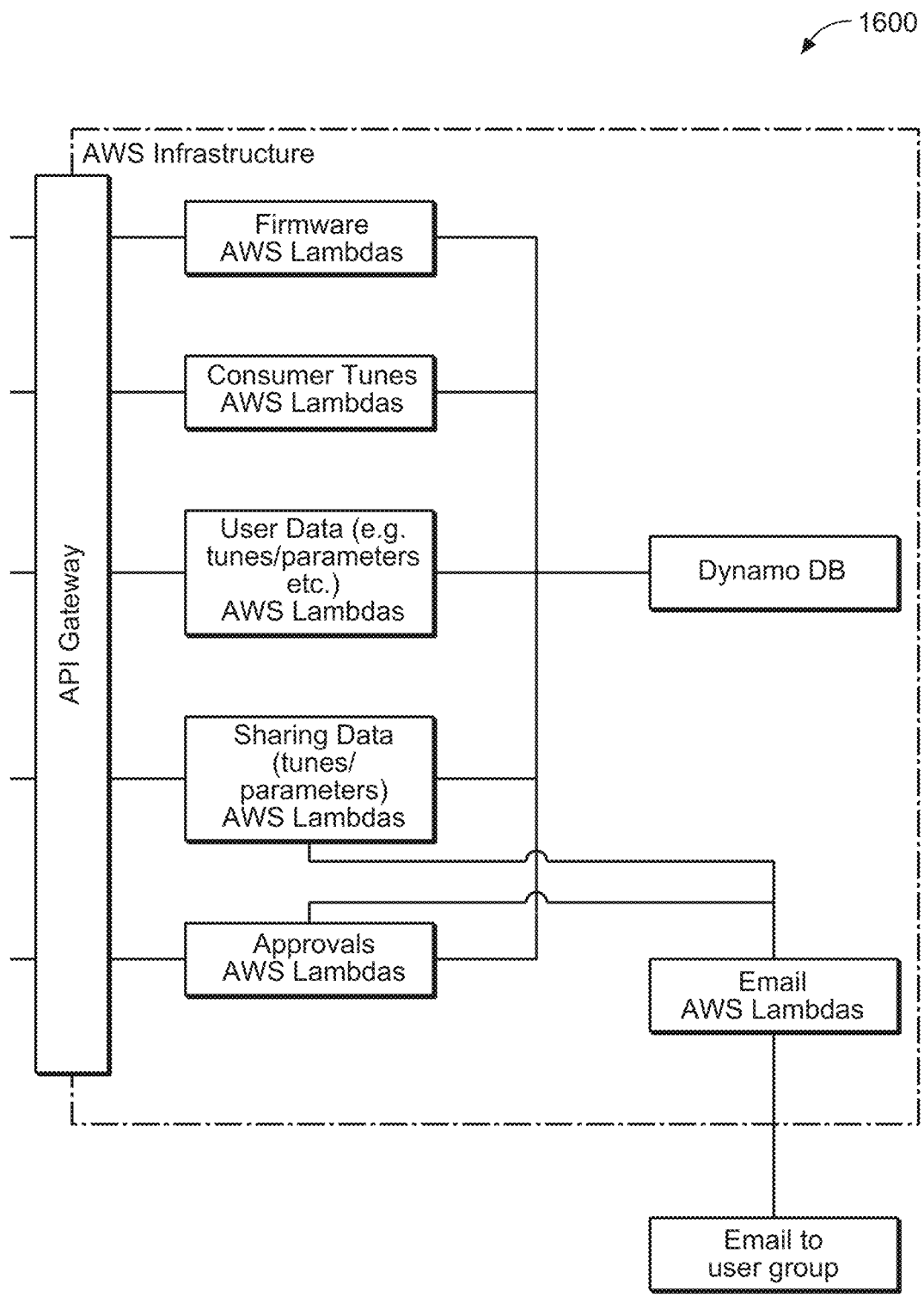
FIG. 16A is a flowchart of an embodiment for sharing custom tunes, in accordance with an embodiment.

Referring now to FIG. 16A, a flowchart 1600 of an embodiment for sharing custom tunes is shown. In flowchart 1600, mobile device application 1124 interacts with a web services server that contains assets such as, but not limited to, firmware, consumer (approved) tunes, user data, sharing data, approval data, or the like. In one embodiment, firmware refers to updates to the mobile device application 1124 or other components. Consumer (approved) tunes refers to things like bike model specific information, and the like. User data refers to aspects such as, bike profiles, images, information, and the like. Sharing data is in one embodiment, a tune "sandbox". Approval data refers to aspects such as what has been approved, what is pending, etc.

Figure 16B:
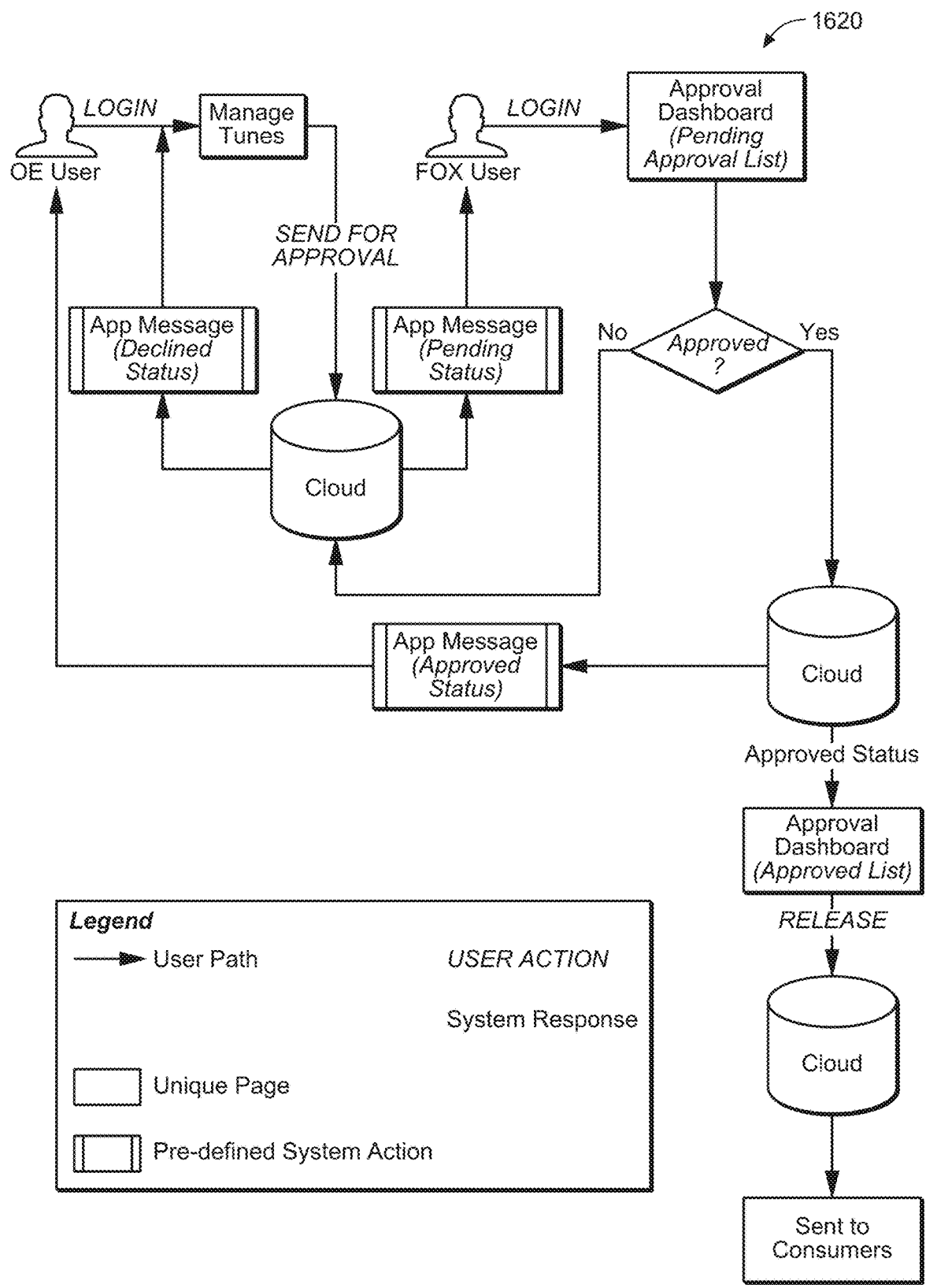
FIG. 16B is a flowchart of an embodiment of a custom tune approval process, in accordance with an embodiment.
Figure 16C:
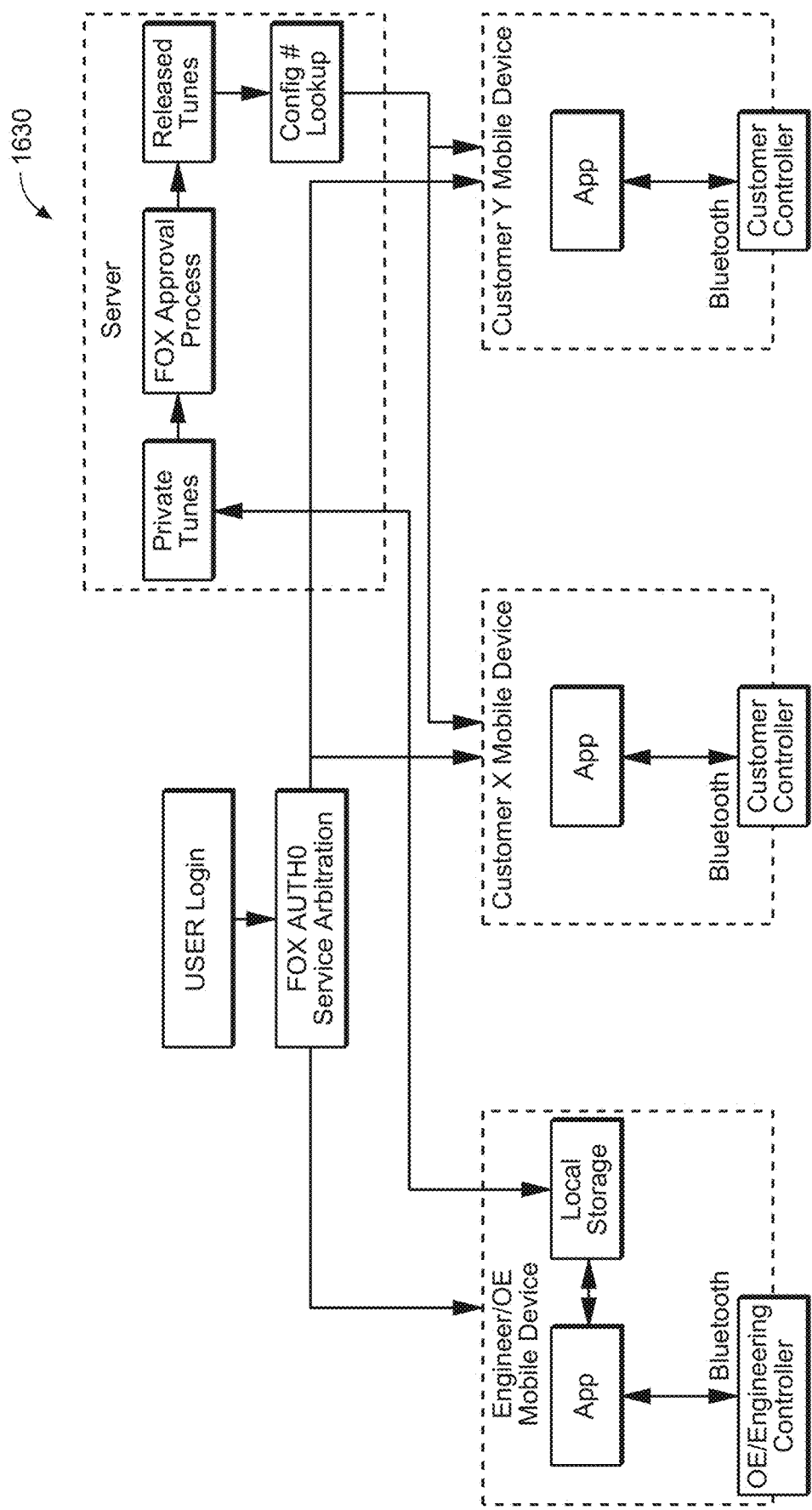
FIG. 16C is a flowchart of an application architecture diagram, in accordance with an embodiment.
Figure 16D:
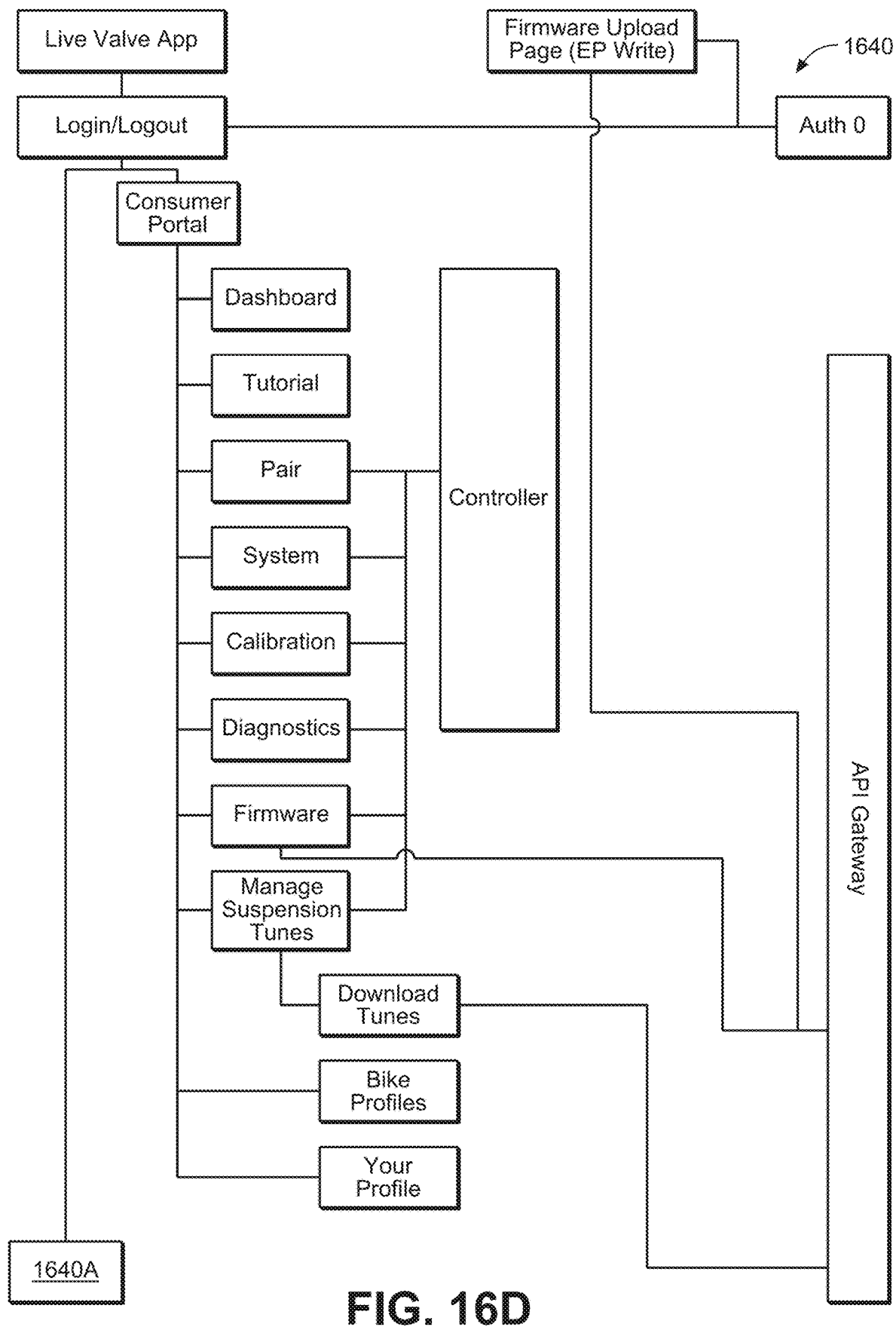
FIG. 16D is a flowchart of a system level application architecture diagram, in accordance with an embodiment.
Figure 16E:
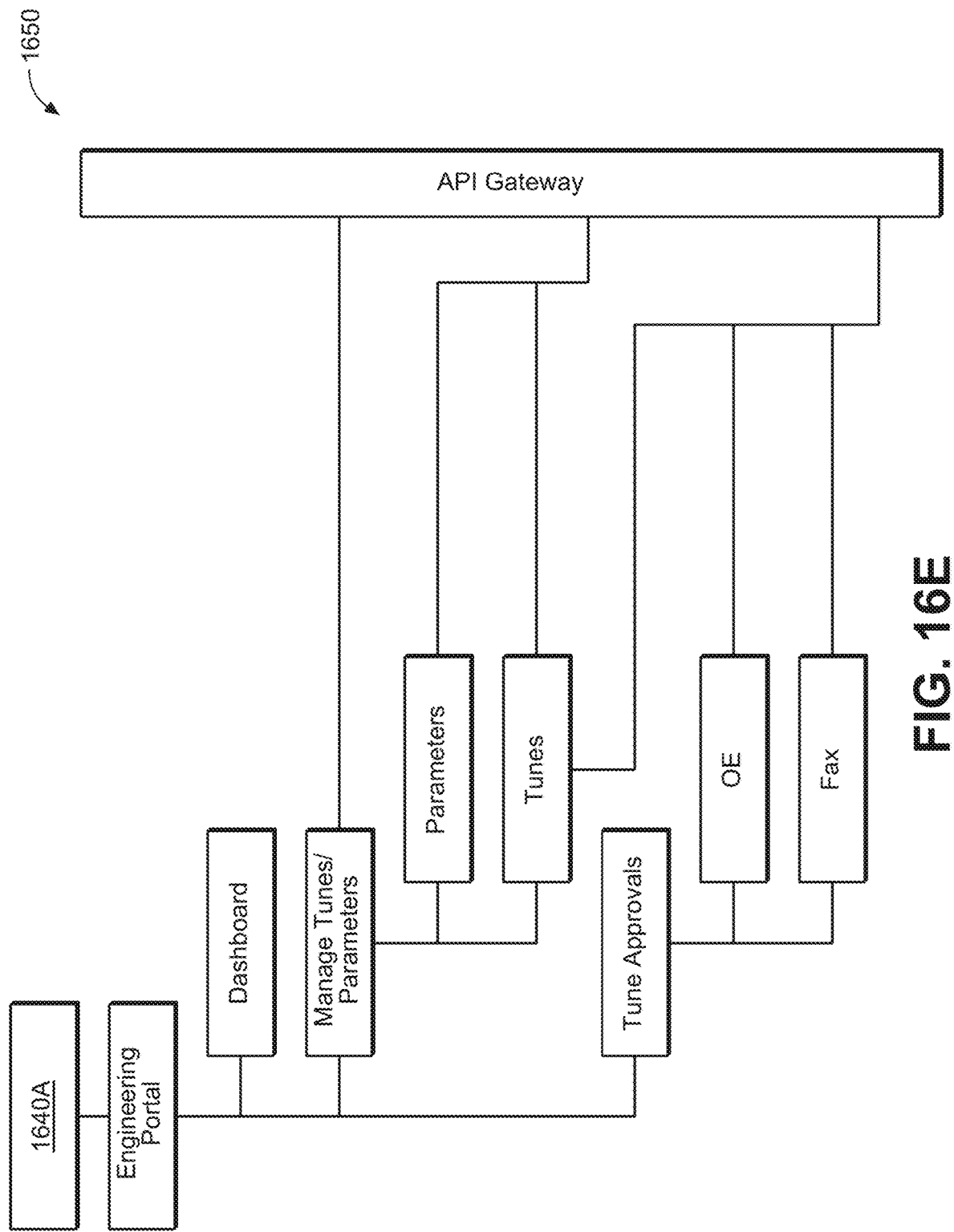
FIG. 16E is a flowchart of a system level engineering portal architecture diagram, in accordance with an embodiment.

With reference now to FIG. 16B, a flowchart 1620 an embodiment of a custom tune approval process is shown. FIG. 16C is a flowchart 1630 of mobile device application 1124 architecture diagram shown in accordance with an embodiment. FIG. 16D is a flowchart 1640 of a system level application 1124 architecture diagram shown in accordance with an embodiment. FIG. 16E is a flowchart 1650 of a system level engineering portal architecture diagram shown in accordance with an embodiment. 1640A of FIG. 16D couples to 1640A of FIG. 16E, and the API gateway leads to the web server shown in further detail in FIG. 16A.

Referring now to FIGS. 16A-16D, in one embodiment, the mobile device application 1124 might include a reduced number of adjustable/modifiable tune features, but the adjustment to one of the tune features could actually provide an underlying adjustment to a plethora of different thresholds, features, or ranges, within the actual underlying application.

Thus, in one embodiment, the disclosed active valve tuner application allows an active suspension component manufacturer (such as FOX racing) to provide active suspension settings to a vehicle manufacturer (e.g., a bicycle OE) such that when the active suspension components are installed during the bicycle build by the OE, the suspension controller (or individual active suspension components) will be tuned to acceptable, optimal, preferential (or the like) settings developed by the active suspension component manufacturer. As such, the performance aspects of the active suspension component will be controlled and/or programmed by input and guidance received from the active suspension component manufacturer.

Moreover, if the OE modifies the tune based on its own testing, rider feedback, and the like, the OE can provide the modified tune to the active valve application tune evaluation process. Once received, the active valve application tune evaluation process can analyze, test, and vet the modified tune with respect to the capabilities of the active suspension component. If the modified tune is within the required parameters of operation, safety, etc., The modified tune from the OE manufacturer can be added to the tune library. If the evaluation process makes any changes to the modified tune, the updated modified tune can then be provided to the OE, added to the tune library, and the like.

Similarly, if a user adds (or replaces) an active suspension component to their vehicle, instead of attempting to manually tune the active suspension component the user can access the live valve application and receive tunes from the active suspension component manufacturer, from other rides with authorized tunes, and the like. Thus, the active suspension component will be tuned with a working tune. Moreover, the user can then begin to experiment with adjustments to one or more aspects of the working tune framework to develop a personalized tune without having to start from scratch.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A system to select and implement a suspension tune, said system comprising:
   a memory configured to store a plurality of suspension tunes;
   a suspension controller configured to implement one of said plurality of suspension tunes for at least one suspension component of a vehicle; and
   a manually operated switch to receive a user input, said manually operated switch configured to navigate between said plurality of suspension tunes, and, based on said user input, designate a different one of said plurality of suspension tunes to be implemented by said suspension controller, wherein said manually operated switch comprises: a plurality of modes, each mode of said plurality of modes tied to a position of said manually operated switch;
   wherein said manually operated switch is programmable by a user of said system, such that said one of said plurality of suspension tunes corresponding to a position of said manually operated switch is adjustable by said user; and
   a database to link each of said plurality of modes with a different one of said plurality of suspension tunes stored in said memory configured to store said plurality of suspension tunes.

2. The system of claim 1, wherein said at least one of said plurality of suspension tunes is automatically implementable by said suspension controller based upon a prior user input to said manually operated switch.

* * * * *